(12) United States Patent

Munteanu et al.

(10) Patent No.: US 12,638,819 B2

(45) Date of Patent: *May 26, 2026

(54) GRAPHICAL ELEMENT SEARCH TECHNIQUE SELECTION, FUZZY LOGIC SELECTION OF ANCHORS AND TARGETS, AND/OR HIERARCHICAL GRAPHICAL ELEMENT IDENTIFICATION FOR ROBOTIC PROCESS AUTOMATION

(71) Applicant: UiPath, Inc., New York, NY (US)

(72) Inventors: Dan Munteanu, Bucharest (RO); Ion Miron, Bucharest (RO)

(73) Assignee: UiPath, Inc., New York, NY (US)

( * ) Notice: Subject to any disclaimer, the term of this patent is extended or adjusted under 35 U.S.C. 154(b) by 1520 days.

This patent is subject to a terminal disclaimer.

(21) Appl. No.: 16/871,696

(22) Filed: May 11, 2020

(65) Prior Publication Data

US 2021/0349430 A1 Nov. 11, 2021

(51) Int. Cl.
G05B 19/042 (2006.01)
G05B 13/02 (2006.01)
(Continued)

(52) U.S. Cl.
CPC ..... G05B 19/0426 (2013.01); G05B 13/0275 (2013.01); G06F 3/04815 (2013.01);
(Continued)

(58) Field of Classification Search
CPC .............. G06F 3/04815; G06F 16/535; G06F 16/2428; G06F 16/3329; G06F 2209/545;
(Continued)

(56) References Cited

U.S. PATENT DOCUMENTS 8,768,041 B2 * 7/2014 Shirkhodaie ............ G06T 7/001
382/152
9,014,430 B2 * 4/2015 Hodder .................. G01N 21/59
382/103
(Continued)

FOREIGN PATENT DOCUMENTS

CN 111126781 A 5/2020
CN 114424167 A 4/2022
(Continued)

OTHER PUBLICATIONS

Nachar, Breaking down Captcha using edge corners and fuzzy logic segmentation/recognition technique, Aug. 10, 2015, Security and Communication Networks, vol. 8, Issue 18, pp. 3995-4012. (Year: 2015).*
(Continued)

*Primary Examiner* — Aaron Tutor
(74) *Attorney, Agent, or Firm* — LeonardPatel PC; Michael A. Leonard, II; Sheetal S. Patel

(57) ABSTRACT

Graphical element search technique selection, fuzzy logic selection for anchors and targets, and hierarchical graphical element identification for robotic process automation (RPA) are disclosed. The fuzzy logic selection of anchors and targets may be part of a larger, tiered, or hierarchical process for identifying graphical elements in the UI. When a selector for a UI element is not found with at least a confidence threshold, similar elements potentially corresponding to the selector for a UI element target may be searched based on fuzzy matching of the target and corresponding anchor(s). Geometric matching may also be employed between the target UI element and its respective anchor(s). The combination of fuzzy matching and geometric matching may allow for more flexible and accurate identification of the exact selector with which an RPA robot is attempting to interact.

19 Claims, 16 Drawing Sheets

(51) Int. Cl.

| | |
|---|---|
| *G06F 3/04815* | (2022.01) |
| *G06F 3/0484* | (2022.01) |
| *G06F 3/04842* | (2022.01) |
| *G06F 8/34* | (2018.01) |
| *G06F 16/242* | (2019.01) |
| *G06F 16/3329* | (2025.01) |
| *G06F 16/535* | (2019.01) |
| *G06F 18/22* | (2023.01) |
| *G06N 7/02* | (2006.01) |

(52) U.S. Cl.
CPC ............ *G06F 3/04842* (2013.01); *G06F 8/34* (2013.01); *G06F 16/2428* (2019.01); *G06F 16/3329* (2019.01); *G06F 16/535* (2019.01); *G06F 18/22* (2023.01); *G06N 7/02* (2013.01); *G06F 3/0484* (2013.01); *G06F 2209/545* (2013.01); *H04Q 2213/13525* (2013.01)

(58) Field of Classification Search
CPC .......... G06F 8/34; G06F 16/332; G06F 18/22; G05B 19/0426; G05B 2219/40334; G05B 13/0275; G05B 13/02; G06N 7/02; H04Q 2213/13525; G06K 9/6201; G06K 9/62
See application file for complete search history.

(56) References Cited

U.S. PATENT DOCUMENTS

| | | | |
|---|---|---|---|
| 9,050,035 B2* | 6/2015 | Yao | A61B 5/1114 |
| 9,075,918 B1 | 7/2015 | Chandra et al. | |
| 9,314,157 B2* | 4/2016 | Yao | A61B 5/163 |
| 9,424,167 B2 | 8/2016 | Lee et al. | |
| 9,555,544 B2* | 1/2017 | Bataller | B25J 9/1679 |
| 9,600,401 B1 | 3/2017 | Haischt et al. | |
| 9,846,634 B2* | 12/2017 | Ji | G06F 11/3688 |
| 9,886,174 B2* | 2/2018 | Clark | G06F 3/0484 |
| 9,965,139 B2 | 5/2018 | Nychis et al. | |
| 10,096,033 B2* | 10/2018 | Heath | G06Q 30/02 |
| 10,261,658 B2 | 4/2019 | Zhang et al. | |
| 10,303,349 B2* | 5/2019 | Lanzkron | G06F 9/45512 |
| 10,489,461 B2* | 11/2019 | Bhattacharjee | G06F 11/1453 |
| 10,817,314 B1* | 10/2020 | Ganesan | G06F 8/38 |
| 10,877,782 B2* | 12/2020 | Zohar | G06F 11/3051 |
| 10,878,531 B2* | 12/2020 | Viet | G06F 16/51 |
| 10,885,423 B1* | 1/2021 | Voicu | G06F 3/04817 |
| 10,956,295 B1* | 3/2021 | Long | G06F 11/3466 |
| 10,970,098 B2* | 4/2021 | Karoliwal | G06F 11/0793 |
| 11,117,259 B2* | 9/2021 | Hall | G06F 9/52 |
| 11,176,443 B1* | 11/2021 | Selva | G06V 30/40 |
| 11,249,729 B2* | 2/2022 | Voicu | G06F 11/3438 |
| 11,281,936 B2* | 3/2022 | Ma | G06Q 10/06398 |
| 11,327,826 B1* | 5/2022 | Shama | G06N 20/00 |
| 11,334,828 B2* | 5/2022 | Negulescu | G06F 16/23 |
| 11,366,439 B2* | 6/2022 | Dubey | G05B 19/042 |
| 11,372,517 B2* | 6/2022 | Munteanu | G06N 20/00 |
| 11,372,650 B2* | 6/2022 | Perera | G06F 11/0772 |
| 11,403,118 B2* | 8/2022 | Munteanu | G05B 13/0265 |
| 11,403,201 B2* | 8/2022 | Balasubramanian | G06Q 10/10 |
| 11,461,164 B2* | 10/2022 | Dines | G06F 11/0706 |
| 11,481,304 B1 | 10/2022 | Kakhandiki | |
| 11,500,762 B2* | 11/2022 | Hamid | G06F 11/3664 |
| 11,720,580 B1 | 8/2023 | Hirsch et al. | |
| 12,164,934 B1 | 12/2024 | Damarapati et al. | |
| 2008/0086700 A1 | 4/2008 | Rodriguez et al. | |
| 2014/0047365 A1 | 2/2014 | Clark et al. | |
| 2014/0253559 A1 | 9/2014 | Li et al. | |
| 2015/0074609 A1 | 3/2015 | Lanzkron et al. | |
| 2015/0378876 A1 | 12/2015 | Ji et al. | |
| 2017/0177743 A1 | 6/2017 | Bhattacharjee et al. | |
| 2018/0157386 A1 | 6/2018 | Su | |
| 2018/0173614 A1 | 6/2018 | Gong et al. | |
| 2018/0189170 A1 | 7/2018 | Dwarakanath et al. | |
| 2018/0204111 A1* | 7/2018 | Zadeh | G06V 10/764 |
| 2018/0217722 A1* | 8/2018 | Venkataraman | G06F 3/04847 |
| 2018/0322004 A1 | 11/2018 | Jain et al. | |
| 2018/0370029 A1* | 12/2018 | Hall | G06F 11/0715 |
| 2019/0034114 A1 | 1/2019 | Natarajan et al. | |
| 2019/0050323 A1 | 2/2019 | Kogan et al. | |
| 2019/0066013 A1* | 2/2019 | Gupta | G06N 7/01 |
| 2019/0141125 A1 | 5/2019 | Ogrinz et al. | |
| 2020/0103244 A1 | 4/2020 | Cella | |
| 2020/0206920 A1 | 7/2020 | Ma et al. | |
| 2020/0401431 A1 | 12/2020 | Rashid et al. | |
| 2021/0042126 A1 | 2/2021 | Perera et al. | |
| 2021/0109717 A1 | 4/2021 | Voicu et al. | |
| 2021/0122051 A1 | 4/2021 | An et al. | |
| 2021/0141619 A1* | 5/2021 | Magureanu | G06F 8/34 |
| 2021/0158256 A1 | 5/2021 | Negulescu | |
| 2021/0252702 A1* | 8/2021 | Hall | B25J 9/1661 |
| 2021/0312299 A1* | 10/2021 | Segal | G06Q 10/10 |
| 2021/0326245 A1* | 10/2021 | Arbon | G06F 11/3688 |

FOREIGN PATENT DOCUMENTS

| | | |
|---|---|---|
| CN | 114556393 A | 5/2022 |
| EP | 3112965 A1 | 1/2017 |
| EP | 4242848 A1 | 9/2023 |
| EP | 4575830 A1 | 6/2025 |
| KR | 1020140043689 A | 4/2014 |
| TW | I744421 B | 11/2021 |

OTHER PUBLICATIONS

Office Action issued in Korean Application No. 10-2020-7028119 on Nov. 30, 2021.

International Search Report and Written Opinion of the International Search Authority issued for PCT Application No. PCT/US2020/052149 on Feb. 4, 2021.

European Search Report issued in EP Application No. 20199161 on Mar. 16, 2021.

Maciej Kuzmicz, "Fuzzy string matching for your selectors, " availabe at https://forum.uipath.com/t/featureblog-19-10-fuzzy-string-matching-for-your-selectors/159036 (Oct. 1, 2019).

Param Kahlon, "UiPath 2020.3 Monthly Update," available at https://www.uipath.com/blog/march-2020-uipath-monthly-update (Mar. 23, 2021).

Quality Thought UiPath Material available at https://www.qualitythought.in/wp-content/uploads/2019/07/UI-PATH-MATERIAL.pdf (Jul. 31, 2019).

Tom Yeh et al., "Sikuli: Using GUI Screenshots for Search and Automation," Proceedings of the 22nd Annual ACM Symposium on User Interface Software and Technology: Victoria, British Columbia, Oct. 4-7, 2009, ACM, New York, NY, pp. 183-192 (Oct. 4, 2009).

Notice of Allowance issued in Korean Application No. 10-2020-7028119 on Jul. 28, 2022.

Examination Report issued in EP Application No. 20199161.9 on Jul. 11, 2023.

Steven Paul Sax, "Notice of Allowance", issued Jan. 13, 2026, U.S. Appl. No. 18/160,904.

\* cited by examiner

Figure 5:
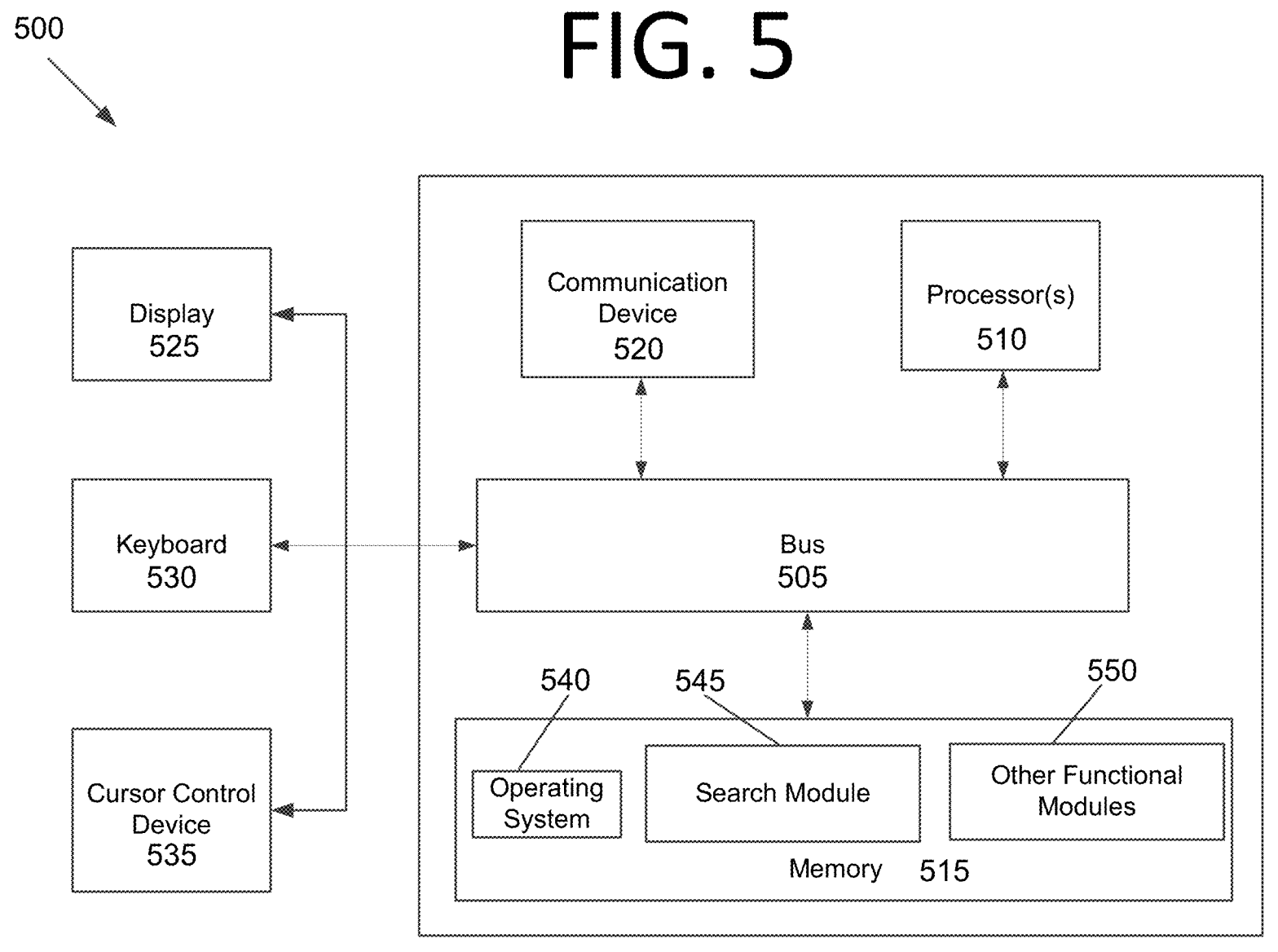

Processor(s)
510

Communication
Device
520

Bus
505

Display
525

Keyboard
530

Cursor Control
Device
535

Other Functional
Modules
550

Search Module
545

Operating
System
540

Memory    515

```
<wnd app='java.exe' cls='SunAwtFrame' title='SwingSet2'/>
<java role='page tab list' />
<java name='Internal Frames Demo' role='page tab' />
<java name='Internal Frame Generator' role='internal frame'/>
<java role='push button' idx='4' />
```

700

1000

1100

1200

START

1210 — Execute First Activity of RPA Workflow

1240 — Execute Next Activity of RPA Robot Workflow

1220 — UI Action?

NO

1230 — More Activities?

YES

YES

NO

1250 — Find Target and Anchor Candidates using Fuzzy Matching Settings

END

1260 — Perform Geometric Matching

1270 — Target Found

NO

1290 — Throw Error

YES

1280 — Perform Activity Operation on Target UI Element

1300

START

1310

Designate Target UI
Element

1320

Receive Selection(s) of
Search Method(s)

1330

Configure RPA Workflow
Activity to Execute
Selected Search Method(s)

END
(Or to FIG. 14)

1400

START
(Or from FIG. 13)

1410

Activity Configuration A

Execute Selector Search

Activity Configuration B

1420A

Also Execute other Search Algorithm(s)

1420B

Target Found?

YES

NO

Select Best Result and Identify Target UI Element

Perform Interaction with Target UI Element

Execute other Search Algorithm(s) to Identify Target UI Element

1430A

1440

END

1430B

GRAPHICAL ELEMENT SEARCH TECHNIQUE SELECTION, FUZZY LOGIC SELECTION OF ANCHORS AND TARGETS, AND/OR HIERARCHICAL GRAPHICAL ELEMENT IDENTIFICATION FOR ROBOTIC PROCESS AUTOMATION

FIELD

The present invention generally relates to robotic process automation (RPA), and more specifically, to graphical element search technique selection, fuzzy logic selection for anchors and targets, and/or hierarchical graphical element detection for RPA.

BACKGROUND

RPA robots may attempt to identify and interact with graphical elements of user interfaces (UIs) of computing systems for certain workflow activities. For instance, an RPA robot may seek to identify a "Submit" button in the UI and perform a mouse click operation on that button. However, correctly identifying graphical elements of a UI so the RPA robot can accurately perform UI interaction activities in its workflow presents substantial technical challenges. Accordingly, an improved approach to identifying and selecting graphical elements may be beneficial.

SUMMARY

Certain embodiments of the present invention may provide solutions to the problems and needs in the art that have not yet been fully identified, appreciated, or solved by current RPA technologies. For example, some embodiments of the present invention pertain to graphical element search technique selection, fuzzy logic selection for anchors and targets, and/or hierarchical graphical element detection for RPA.

In an embodiment, a computer-implemented method includes designating a target UI element in an image of a portion or all of a UI of an application or a UI of a live application on which automation is to be performed at design time, by an RPA designer application. The computer-implemented method also includes receiving a selection of one or more search algorithms at design time, by the RPA designer application, and configuring an activity of an RPA workflow to execute the selected one or more search algorithms at design time, by the RPA designer application.

In another embodiment, a computer-implemented method for identifying a target UI element associated with an activity of an RPA workflow includes executing a selector search for the target UI element at runtime to identify the target UI element, by an RPA robot implementing the RPA workflow. When the target UI element is not found, the computer-implemented method includes executing a fuzzy selector search, a target and anchor search, a fuzzy target and anchor search, image matching, text matching, CV matching, or a combination thereof, to identify the target UI element, by the RPA robot. The computer-implemented method also includes performing an interaction with the identified target UI element, by the RPA robot, based on the activity of the RPA workflow.

In yet another embodiment, a computer-implemented method for identifying a target UI element associated with an activity of an RPA workflow includes executing a selector search and at least one of a fuzzy selector search, a target and anchor search, a fuzzy target and anchor search, image matching, text matching, and CV matching for the target UI element at runtime, by an RPA robot configured to implement the RPA workflow. The computer-implemented method also includes selecting a best result from the selector search and the at least one of the fuzzy selector search, the target and anchor search, the fuzzy target and anchor search, the image matching, the text matching, and the CV matching based on validation scores, by the RPA robot, to identify the target UI element. The computer-implemented method further includes performing an interaction with the identified target UI element, by the RPA robot, based on the activity of the RPA workflow.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is an architectural diagram illustrating a computing system configured to perform graphical element searching for RPA, according to an embodiment of the present invention.

Unless otherwise indicated, similar reference characters denote corresponding features consistently throughout the attached drawings.

DETAILED DESCRIPTION OF THE EMBODIMENTS

Figure 1:
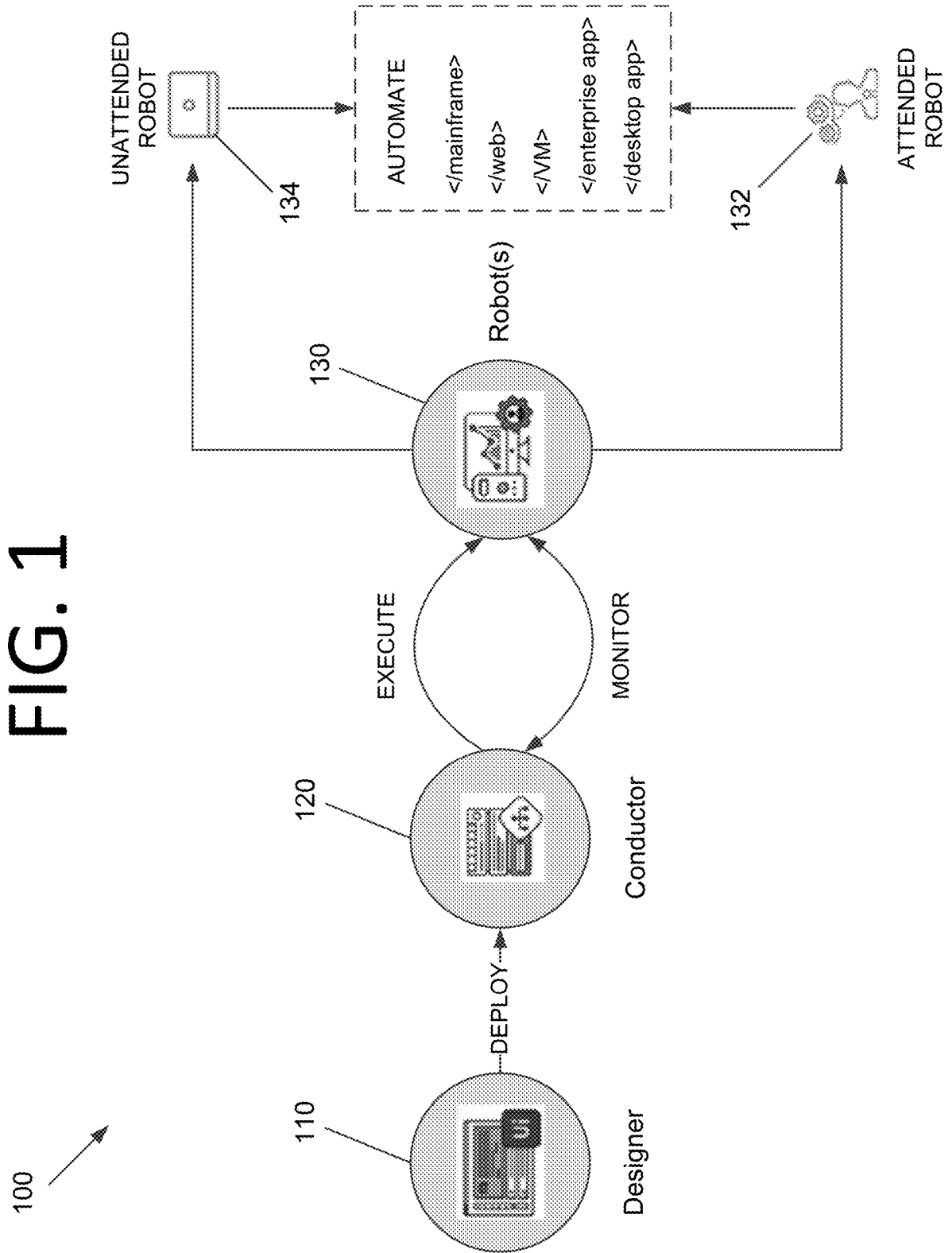
FIG. 1 is an architectural diagram illustrating a robotic process automation (RPA) system, according to an embodiment of the present invention.

Some embodiments pertain to graphical element search technique selection, fuzzy logic selection for anchors and targets, and/or hierarchical graphical element detection for RPA. As defined herein, a "target" is a graphical element in the UI (also called a "UI element" herein) that a robot seeks to interact with and an "anchor" is another graphical element in the UI that may be used to more accurately identify the target UI element based on one or more relationships between the target and one or more anchors. To automate specific actions in the user interface, RPA robots may seek to interact with the target (e.g., a window, a button, a drop-down list, a text field, etc.) by clicking the target, adding text, selecting a menu item, etc. Selectors may be used in some embodiments for the target and anchor(s) to store the attributes of the respective UI element and its parents (e.g., in an Extensible Markup Language (XML) fragment).

Information regarding the target and its anchor(s) may be stored in a UI descriptor, which in some embodiments is an encapsulated data/struct format that includes a target UI element selector, anchor selector(s), a computer vision (CV) selector for the target and anchor, a screen image capture (context), a UI element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention.

The fuzzy logic selection of anchors and targets may be part of a larger, tiered, and/or hierarchical process for identifying graphical elements in the UI in some embodiments. For instance, the system may first search for a selector for a target UI element by screen scraping, using native operating system (OS) functionality, etc. If the selector for the UI element is not found with at least a confidence threshold (e.g., 97%, 85%, etc.), similar elements potentially corresponding to the selector for a UI element target may be searched based on fuzzy matching of the target, and/or corresponding anchor(s) may be used to more accurately identify the target. By employing fuzzy matching, the system may be able to identify targets and/or anchors where one or more attributes thereof do not exactly match what is found in a runtime UI.

Geometric matching may also be employed between the target and its respective anchor(s) in some embodiments. The combination of fuzzy matching and geometric matching may allow for more flexible and accurate identification of the correct UI element with which an RPA robot is attempting to interact. At runtime, after finding similar targets, some embodiments may additionally or alternatively verify that text of similar targets matches text of the desired UI element using fuzzy matching. This may help to prevent the RPA robot from clicking the wrong button, for example.

The fuzzy matching of some embodiments may provide candidates if the underlying runtime UI element candidates have changed. For instance, perhaps the appearance and/or location of a UI element from design time is different at runtime due to resolution changes, application design changes in a new version or due to a customization for a client, etc. A list of closest candidates to what was indicated at design time may be retrieved and the best candidate may be selected using fuzzy matching. This can also apply to cases where characteristics of the anchor(s) change at runtime.

In some embodiments, geometric matching may be relatively relaxed to attempt to accommodate UI changes. For instance, the angles between line segments connecting a target and its anchors may differ by some amount, distance tolerances could be used, etc. Tolerances for some components may be stricter than others as a matter of design choice at design time. For instance, a developer may desire for a target to be directly to the right of a given anchor within a tight or exact tolerance. This may be beneficial for grid layouts, for example.

In some embodiments, defined rectangles for the target and its anchor(s) are captured at design time and the geometric validation logic is composed at runtime. After the fuzzy logic is applied to identify a set of potential targets and a set of potential anchors, a suitable target and anchor may be chosen based on relative positions on the screen at design time, for example. This may simplify the design time task for the RPA developer. In some embodiments, if the system cannot accurately discriminate between two or more UI elements when looking for a given selector for a target, the developer may be required by the designer application to add one or more additional anchors until the combination of the target and the anchor(s) provides identification thereof with a certain confidence.

At design time, in some embodiments, multiple or all combinations of a target and its anchors may be tried to find minimum number of anchor(s) required to uniquely identify the target. This may be based on a validation score, for example. In some embodiments, different or multiple methods may be selected. For instance, a selector method, a fuzzy selector method, a multi-anchor method, an image matching method, or a combination thereof may be employed. In certain embodiments, these techniques may be selected based on a user selection in a designer application.

These methods may be applied in an order (also called a "hierarchical approach" herein) in some embodiments. For instance, a selector search method may be attempted first to see if the element can be uniquely identified based on the tree-like characteristics of its selector. If the selector can be uniquely identified with a certain validation score, the hierarchical approach may stop there. However, in certain embodiments, all selected methods are applied at once and the best result is chosen.

It is possible that the selector-based approach does not find a candidate. For instance, the location and/or appearance of a graphical element changes due to a new version of an application, a change in screen resolution, etc., the selector-based approach may not find a candidate. In this case, for hierarchical embodiments, the fuzzy selector technique may be employed. This may search for a target UI element, or for a target UI element and its anchor(s), using fuzzy matching. Image matching may be used to check whether an image of a target UI element matches an element on the screen. Text matching may require that the text in a target UI element precisely matches a given string, for example.

In embodiments where all selected methods are employed, the results from each method may be compared using respective validation scores and the best result may be selected. For instance, if there are 16 ways that are found to reach a target using the selected methods, the validation scores will tend to find the most accurate candidate. For instance, if the fuzzy selector technique provides a candidate with a score of 1 or that has a significantly higher score than the rest of the candidates (e.g., 0.1 or more), this candidate may be chosen.

If this is not the case, the fuzzy matching approach would provide duplicate candidates. An anchor may then be specified for the target to attempt to uniquely identify the target. In some embodiments, the anchor may be added automatically or suggested anchors may be proposed to the user. If adding this anchor does not enable unique identification of the target above a confidence threshold, additional anchor(s) may be added until the target is uniquely identified with at least the confidence threshold.

In some embodiments, the fuzzy selector accuracy may be selected by the user (e.g., via a slider, manual input, etc.) to filter candidates. For instance, candidates below 0.7 may be ignored if that is the selected accuracy. The user may tweak the selector accuracy until the target is uniquely identified. In testing of some embodiments, a selector accuracy value of 0.7 tends to work well, particularly if there is one or more anchors. The developer may be informed how many of the combinations find the target.

Fuzzy targets and anchors may be particularly beneficial in some embodiments for modern web applications, where identifiers (IDs) for web components are often generated on each new page load. The ID for a given UI element thus tends to change each time, and selectors may not work if they rely on static IDs. Fuzzy targets and anchors may then be used to provide candidates despite the ID changes. In some embodiments, the tag, type, or role of the UI component may not be allowed to change so it remains generally the same at run time.

In some embodiments, when a developer seeks to edit a target, the developer may click an "edit target" option in a designer application. The target is then validated using the method(s) discussed above, for example. When the developer runs the validation, a UI tree of the application may only be searched one time in some embodiments.

Consider the case where the validation score of finding a target using the selector approach alone is 100% on a webpage, but the webpage is refreshed such that element IDs change, for example. If validation is performed again, the validation may fail. This may cause the application to try the fuzzy selector approach. The developer may go to the activity in the workflow that fails, select "edit target," and see what is wrong with the configuration. This enables the developer to choose which target identification method(s) to try for this activity. In some embodiments, the selector method may be tried first, and if this fails, the application may perform fuzzy selection of targets and anchors (and corresponding geometric matching) in parallel with image matching and text matching, if desired.

For geometric matching, at runtime, each set of target and anchor candidates may be compared to the matching candidates at design time. Candidates may be retrieved from the driver (e.g., driver(s) 340 of FIG. 3) and the positions and other geometric characteristics may be compared to those of the runtime candidates. Geometric matching may thus be run on static positions that are discovered using fuzzy matching of the target and its anchor(s). In some embodiments, a geometric matching algorithm may be applied using candidates from computer vision, but candidates tend to be more common at runtime. Modifying the fuzzy selector parameters to reduce the number of matches and/or capping the number of matches may thus be beneficial. For such embodiments.

In some embodiments, a single driver call may be made for fuzzy matching of the target and all corresponding anchors. For fuzzy matches, if there is one target and three anchors, for example, instead of four calls to the driver, a single call may be made to get all target and anchor candidates. To accomplish this, the driver may traverse the application tree once and get the candidates for the target and the anchor(s) in the same tree traversal. Thus, sequential calls to the driver for the target and each anchor may not be required. In the embodiments above where multiple search methods are employed (e.g., a normal selector, a fuzzy selector, and a fuzzy selector and fuzzy anchor(s)), the UI tree may be parsed once and all selected methods may then be validated.

For some attributes, the text should not change and the underlying fuzzy logic selection of the target and anchors may not be aware of this restriction. For instance, it may be desired that a first name match the text of a UI element exactly. The fuzzy logic may provide multiple candidates, but not provide an exact match for such information. At runtime, some embodiments obtain each candidate, call the driver to get the underlying text, and then check whether there is an exact match if an appropriate option is selected. If not, the candidate may be discarded. In certain embodiments, a single driver call may be made to obtain the text for all candidates, per the above.

It may be desirable to enforce an image on the driver side. For instance, fuzzy matching may provide various graphical icons when looking for a given UI element, but not be able to determine which icon is the correct icon. There may be no text for the icon for verification purposes.

To address this issue, some embodiments allow the developer to indicate at design time that a match of an image at runtime is mandatory. After the fuzzy matching provides image candidates, image comparisons may then be performed on the candidates to uniquely identify the correct candidate. In some embodiments, the driver may also provide candidates that are not visible to the user (e.g., candidates that are outside of the frustum of a user's display and could be considered to the left, right, above, or below what is shown on the screen). These candidates could be used for matching or discarded, depending on the desired logic.

In some embodiments, an option may be provided for the fuzzy selector matching to also perform image matching. To perform image matching on the entire image for a high resolution monitor may take 10-15 seconds using some computing systems. By using fuzzy selector image matching, for example, a much smaller image associated with a given UI element may be compared with a target element image, which provides candidates much faster with can provide these candidates much faster than searching the entire image.

When multiple tags are enclosed in a fuzzy selector in some embodiments, the processing logic slows down. Some embodiments provide speed improvements to make this processing run faster. To identify the best candidates for a tag, the entire UI tree of the application is parsed in some embodiments. Rather than performing the parsing on a per-tag basis, some embodiments may parse the UI tree once to find targets for all tags. In other words, once a first tag is found, parsing may continue to find the second tag, then the third, then the fourth, etc. until all tags are found.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
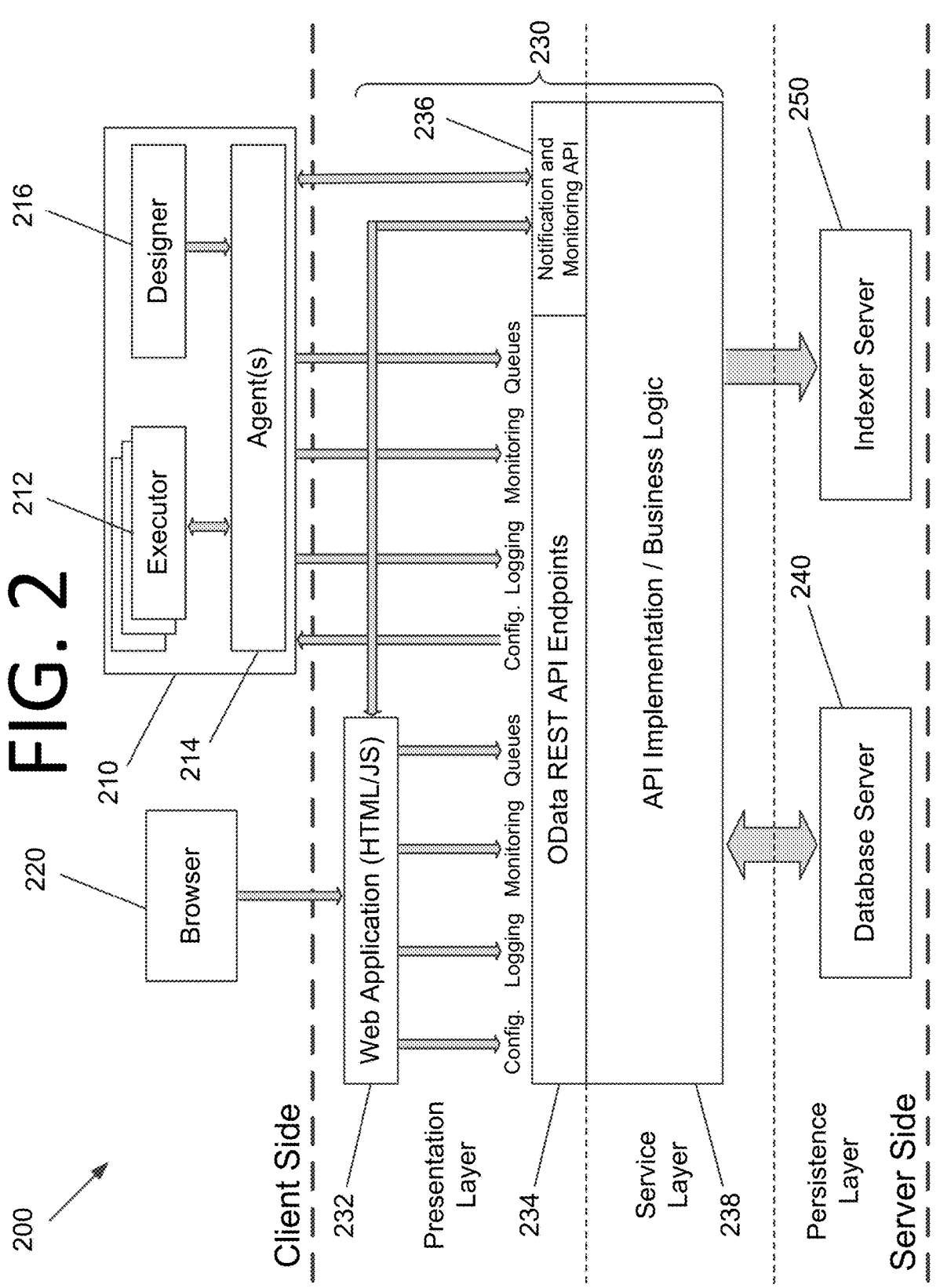
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server

250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
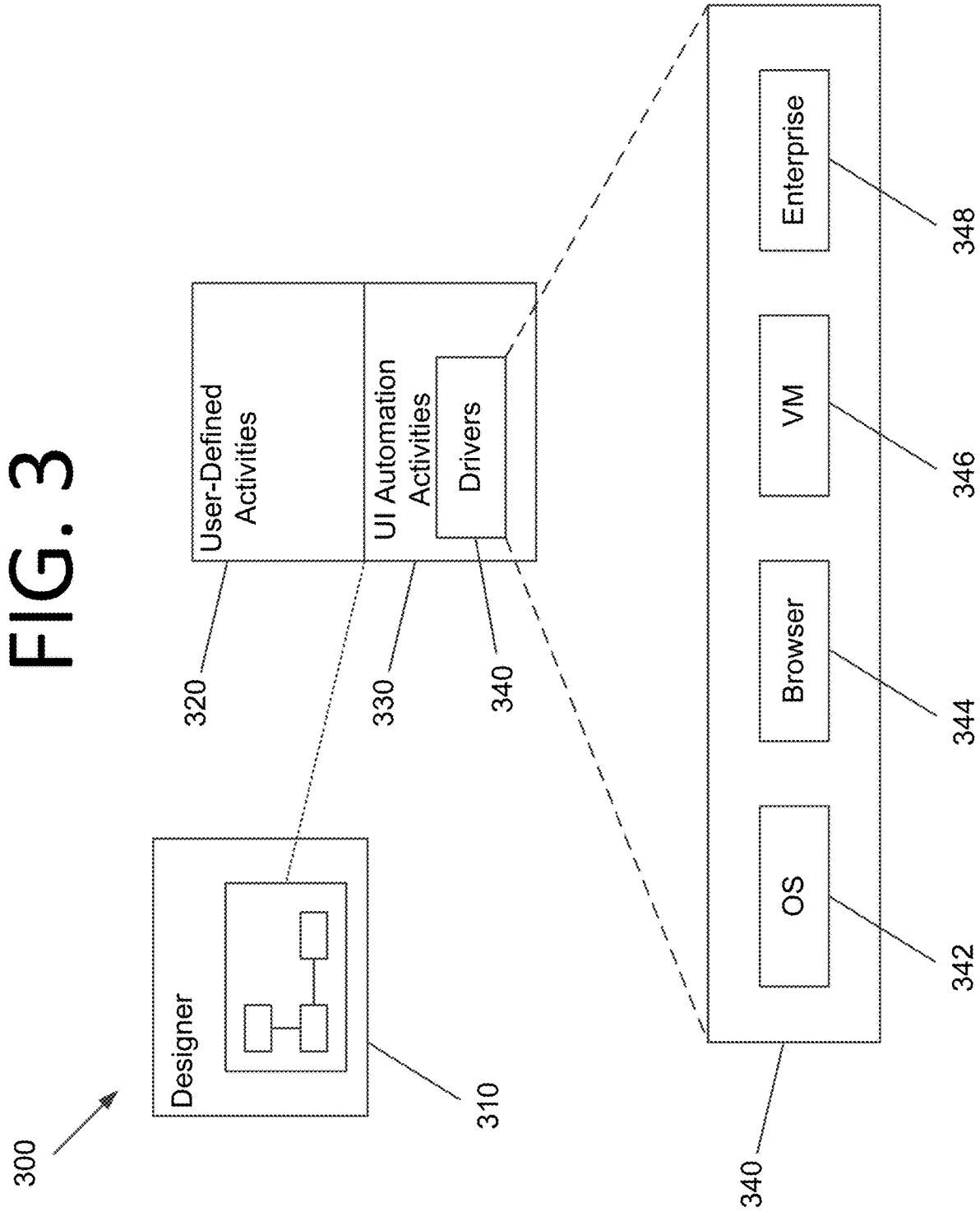
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
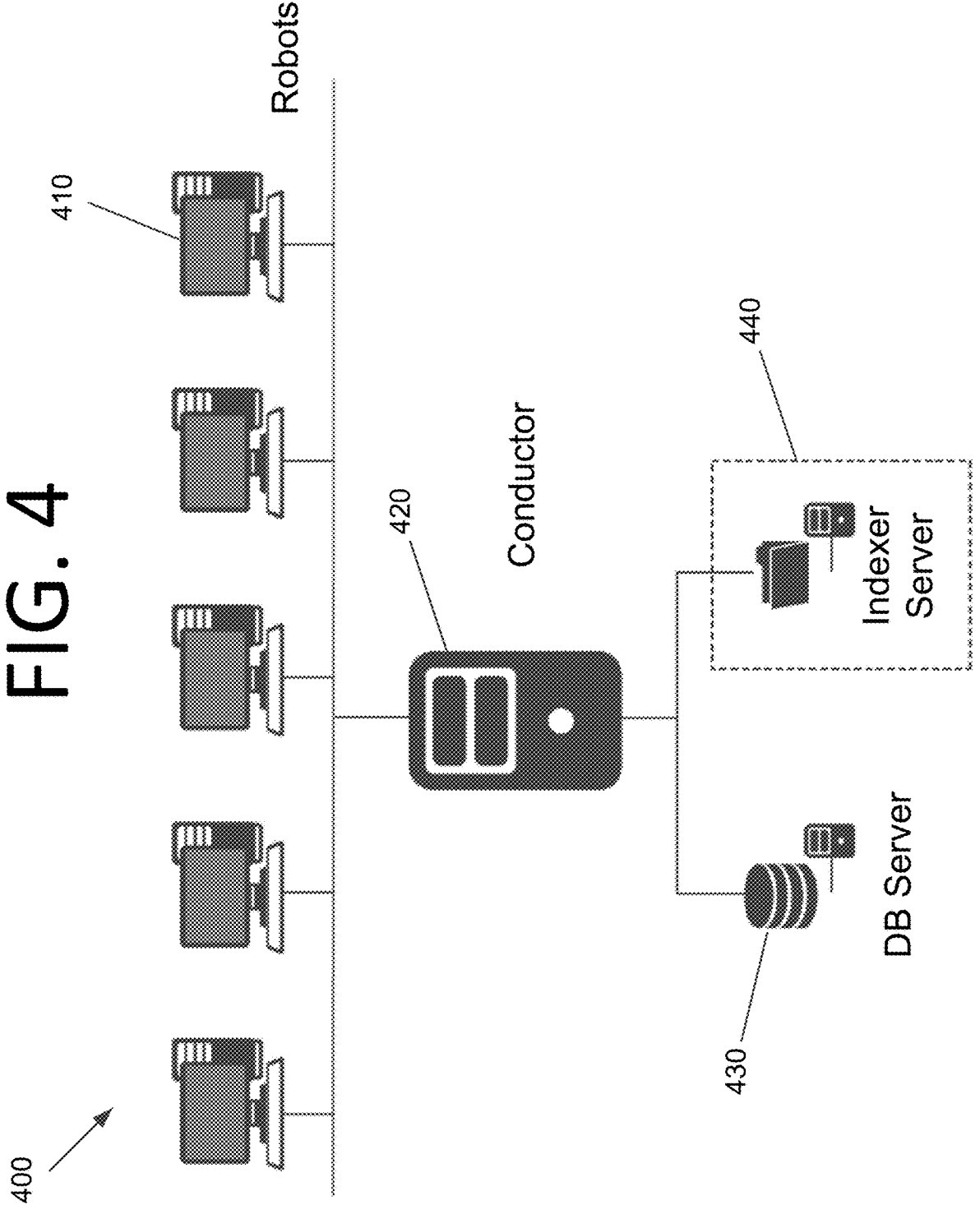
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

FIG. 5 is an architectural diagram illustrating a computing system 500 configured to perform graphical element searching for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B(HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and/or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a search module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
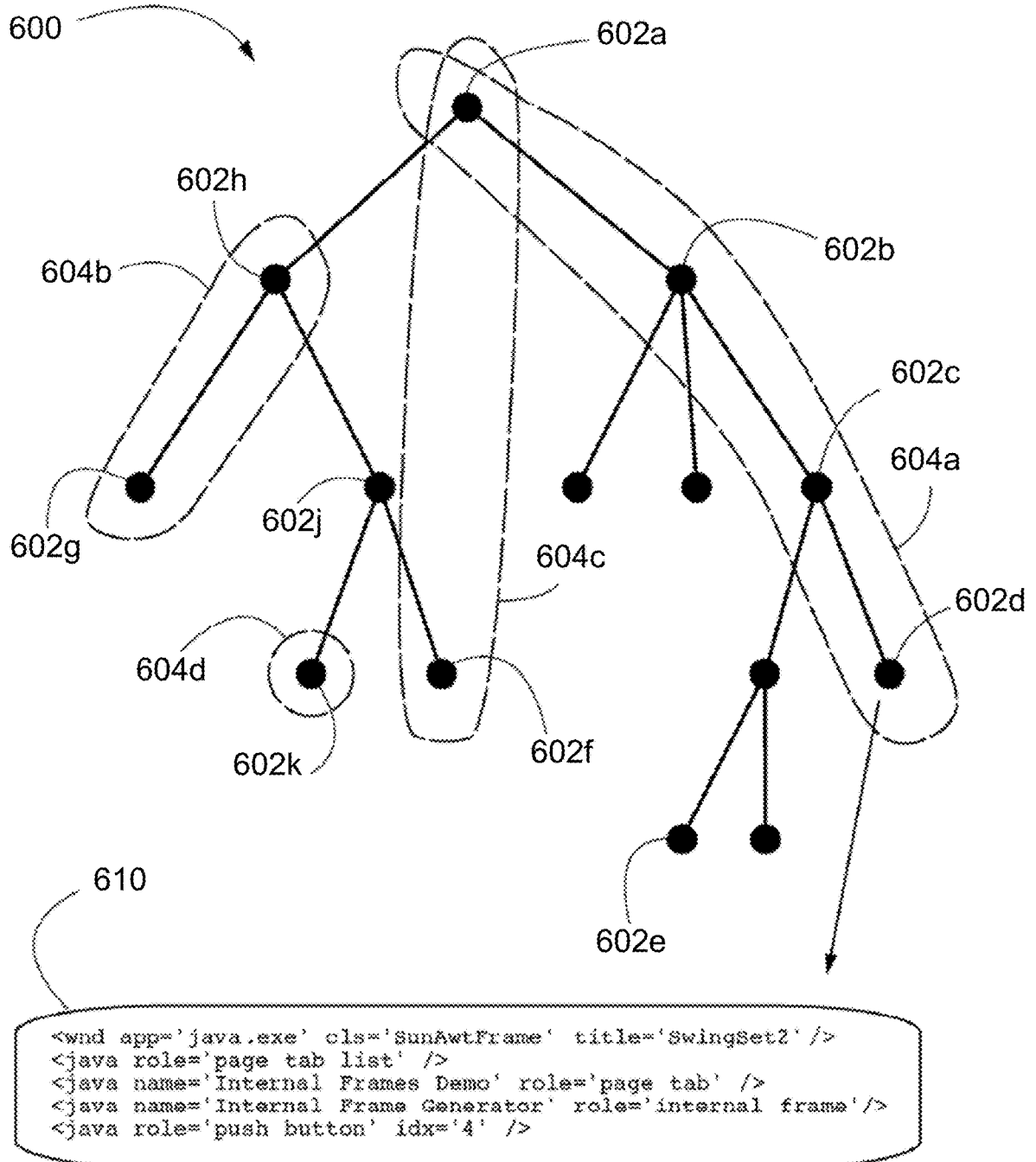
FIG. 6 illustrates an example UI tree, according to an embodiment of the present invention.

In modern computing systems, the operating system typically represents each user interface as a hierarchical data structure that is commonly referred to as a UI tree. An example UI tree may include a document object model (DOM) underlying a webpage rendered by a web browser application. FIG. 6 shows an example UI tree 600 having a plurality of nodes 602a-k. In some embodiments, each node 602a-k includes an object representing a part of a UI. In an example UI, a root node 602a may represent an entire UI window. Its child nodes 602b and 602h may represent individual UI elements (e.g., text boxes, labels, form fields, buttons, etc.), groups of elements, distinct regions or blocks of the respective UI, etc. An intermediate node, such as node 602b in FIG. 6, may represent a whole form, including all input fields, labels, and buttons. For instance, node 602b may represent the contents of a <form> or <fieldset> container of an HTML document. Another example of an intermediate node may represent a content of a <div> or <span> HTML container. Yet another example of intermediate node comprises contents of a header or footer of a document. However, any suitable representation may be used without deviating from the scope of the invention. End nodes, such as 602d, 602e, 602f, 602g, and 602k (also called "leaf nodes" herein) are nodes that have no further child nodes. End nodes may represent individual UI elements (e.g., a button, an individual label, an individual input field, etc.). In an example of a web browser UI, end nodes may represent individual images, hyperlinks, text paragraphs, etc.

A set of nodes consisting exclusively of a selected node of the UI tree and of its descendants is described herein as a "subtree" of the UI tree. The respective subtree is further deemed a subtree of an ancestor of the root node of the respective subtree. In UI tree 600 depicted in FIG. 6, nodes 602f-602g-602h-602j-602k form an example subtree of node 602a since node 602h is a descendant (child) of node 602a.

To enable a successful and ideally unambiguous identification by an RPA robot, some embodiments of the present invention represent each UI element using an element ID characterizing the respective UI element. The element ID in some embodiments indicates a location of a target node within UI tree 600, where the target node represents the respective UI element. For instance, the element ID may identify a target node/UI element as a member of a selected subset of nodes. The selected subset of nodes may form a genealogy, i.e., a line of descent through the UI tree where each node is either an ancestor or a descendant of another node. Exemplary genealogies 604a-d are illustrated in FIG. 6.

In some embodiments, the element ID includes an ordered sequence of node indicators, the sequence tracing a genealogical path through the UI tree, and the path ending in the respective target node/UI element. Each node indicator may represent a member of an object hierarchy of the respective UI and its position within the sequence consistent with the respective hierarchy. For instance, each member of the sequence may represent a descendant (e.g., a child node) of the previous member, and may have the following member as a descendant (e.g., a child node). In a HTML example, an element ID representing an individual form field may indicate that the respective form field is a child of an HTML form, which in turn is a child of a specific section of a webpage, etc. The genealogy does not need to be complete in some embodiments. For instance, genealogy 604c includes just the leaf and root node, but still identifies node 602f as a UI element displayed within the GUI window represented by root node 602a.

In one such example illustrated in FIG. 6, where an element ID 610 is expressed in a version of XML, each individual node indicator includes an XML tag. Element ID 610 characterizing node 602d therefore may include a sequence of tags, with the first tag representing a GUI window (node 602a) and the last tag representing target node 602d itself (in this example, a button). Intermediate tags of element ID 610 may represent nodes such as 602b and 602c, among others. Each tag may include a sequence of characters with the sequence book-ended by implementation-specific delimiters (in the current example, each tag begins with "<" and ends with "/>"). In FIG. 6, each tag is specified via a set of attribute-value pairs, which may indicate, for instance, a name and a type of UI element represented by the respective node, among others. The illustrated format of element ID 610 is provided only as a nonlimiting example. One skilled in the art will appreciate that there may be multiple ways to represent a location of a specific node within a UI tree other than a list of attribute-value pairs.

At runtime, an RPA robot may attempt to identify an operand/target of an action within a runtime instance of the target UI (e.g., within an instance of a user application executing on the runtime computing system). In practice, identifying the operand may include attempting to identify a runtime instance of a target UI element, also called a "runtime target" herein. Some embodiments attempt such identification according to the respective element ID and/or according to other information, such as an image of the respective UI element, a label displayed next to or on top of the respective UI element, etc. Matching element IDs may fail in situations where some characteristic features of the respective UI element have changed between design time (e.g., when the workflow of the RPA robot is being developed) and runtime. To overcome such situations, some embodiments attempt a fuzzy (partial) match of the element ID, as described in more detail below.

At design time, a user may select a target UI element that an RPA workflow activity is intended to interact with. Selectors may be used in some embodiments for the target and anchor(s) to store the attributes of the respective UI element and its parents (e.g., in an XML fragment). Selectors may overcome the problems associated with fixed coordinate identification by storing the attributes of a UI element and its parents in an XML fragment. While selectors may be automatically generated in some embodiments where the UI is static, some software programs, such as some web applications, have changing layouts and attribute nodes with volatile values. These changes may not be readily predictable, and this previously required manual generation of some selectors. However, some embodiments may overcome this issue.

A selector has the following structure in some embodiments:

. . .

The last node represents the UI element of interest, and all previous nodes represent the parents of that element. <node_1> is usually referred to as a root node and represents the top window of the application.

Each node may have one or more attributes that assist with correct identification of a specific level of the selected application. Each node has the following format in some embodiments:

<ui_system     attr_name_1='attr_value_1'     .    .    .
    attr_name_N='attr_value_N'/>

Every attribute may have an assigned value, and attributes with constant values may be selected. This is because changes to the value of an attribute each time the application is started may lead to the selector not being able to correctly identify the associated element. However, fuzzy matching may be employed in some embodiments to allow for a certain degree of imprecision and flexibility in the matching.

Figure 7:
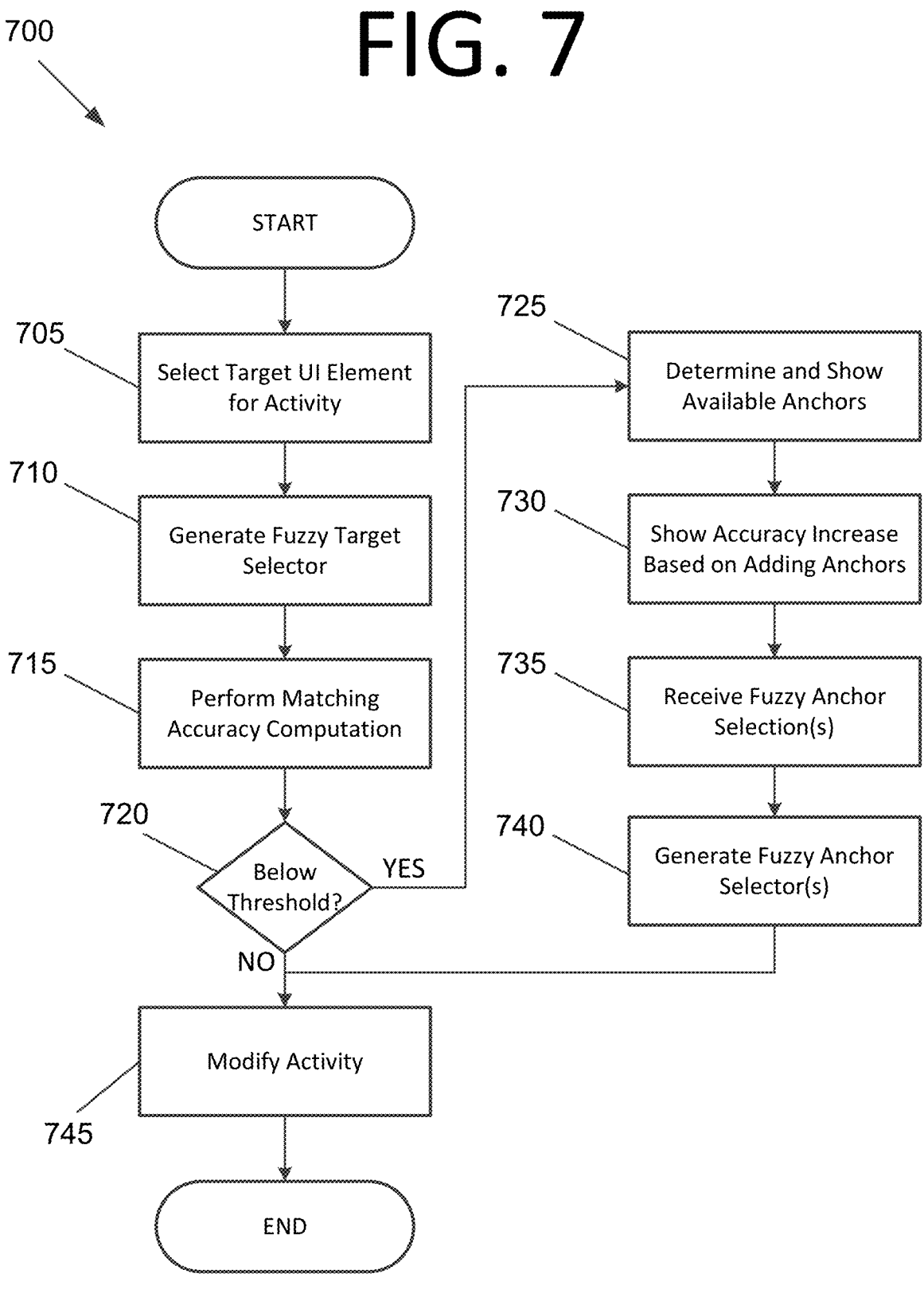
FIG. 7 is a flowchart illustrating a process for selecting targets and anchors for UI element identification using fuzzy matching, according to some embodiments of the present invention.

FIG. 7 is a flowchart illustrating a process 700 for selecting targets and anchors for UI element identification using fuzzy matching, according to some embodiments of the present invention. The process begins with a developer selecting a UI element for an RPA workflow activity at 705. For example, the developer may select a button on the screen for an activity that will seek to find and click the button. A driver (e.g., driver 340) then generates a fuzzy selector for the target UI element at 710.

In some embodiments, the generation of the fuzzy target selector is performed responsive to a developer selecting an option for fuzzy matching for a target UI element. In certain embodiments, the developer may select a similarity threshold for the fuzzy matching. In some embodiments, the fuzzy selector includes the element ID of the selected UI element. This may be determined by parsing the source code (e.g., HTML) of the target UI and extracting and/or formulating a set of tags including attribute-value pairs.

A matching accuracy computation is then performed at 715 (e.g., using a machine learning (ML) model) to determine how well the fuzzy target selector generated by the driver matches the UI element. If the accuracy computation is below a threshold at 720 (e.g., below 97%, below 95%, etc.), it is possible that the target UI element may not be determined as accurately as desired at runtime. The acceptable accuracy may vary based on task(s) being accomplished by the RPA workflow. Available anchors are determined and shown at 725. The increase in accuracy based on adding each anchor is then shown at 730. For instance, a percentage increase in accuracy due to adding the anchor may be displayed, the total accuracy may be displayed, etc.

Fuzzy anchor selection(s) are received from the developer or made by the designer application at 735 and fuzzy anchor selector(s) are generated for the fuzzy anchor(s) at 740. In some embodiments, this may involve the developer selecting a fuzzy matching option for one or more anchors with respective similarity thresholds. In certain embodiments, each anchor may have its own similarity threshold. In some embodiments, one or more anchors may be fuzzy anchors and one or more other anchors may not be fuzzy anchors. For instance, fuzzy matching may not be desired for a certain anchor if its attribute(s) are expected to conform with a strict tolerance. In certain embodiments, the designer application may automatically add one or more anchors until the threshold is met or exceeded. In such embodiments, steps 725-735 may be omitted.

If the threshold is exceeded at 720 (either at the first encounter of step 720 or after adding anchor(s)), the activity is modified to include the fuzzy selectors for the target and anchor(s) at 745. This may include adding the fuzzy selectors to a UI descriptor in some embodiments and causing the activity to use that UI descriptor. Multi-anchor matching may be performed in some embodiments to increase the accuracy of the execution of the RPA workflow activity at runtime.

Anchors are other UI elements that can be used to assist in uniquely identifying a target UI element. For instance, if multiple text fields are included in a UI, searching for a text field alone is insufficient to uniquely identify a given text field. Accordingly, some embodiments look for additional information in order to uniquely identify a given UI element. Using the text field example, a text field for entering a first name may appear to the right of the label "First Name". This first name label may be set as an "anchor" to help to uniquely identify the text field, which is the "target".

Various positional and/or geometric associations between the target and the anchor may be used in some embodiments, potentially within one or more tolerances, to uniquely identify the target. For instance, the center of bounding boxes for the anchor and the target may be used to define a line segment. This line segment could then be required to have a certain length within a tolerance and/or slope within a tolerance to uniquely identify the target using the target/anchor pair. However, any desired position of the location associated with the target and/or anchors may be used in some embodiments without deviating from the scope of the invention. For instance, the point for drawing line segments may be in the center, upper left corner, upper right corner, lower left corner, lower right corner, any other location on the border of the bounding box, any location within the bounding box, a location outside of the bounding box as identified in relation to the bounding box properties, etc. In certain embodiments, the target and one or more anchors may have different locations within or outside of their bounding boxes that are used for geometric matching.

Per the above, a single anchor may not always be sufficient to uniquely identify a target element on a screen with a certain confidence. For instance, consider a web form where two text field for entering a first name appear to the right of respective labels "First Name" in different locations on the screen. In this example, one or more additional anchors may be useful to uniquely identify a given target. The geometric properties between the anchors and the target (e.g., line segment lengths, angles, and/or relative locations with tolerances) may be used to uniquely identify the target. The user may be required to continue to add anchors until a match strength for the target exceeds the threshold.

Figure 8A:
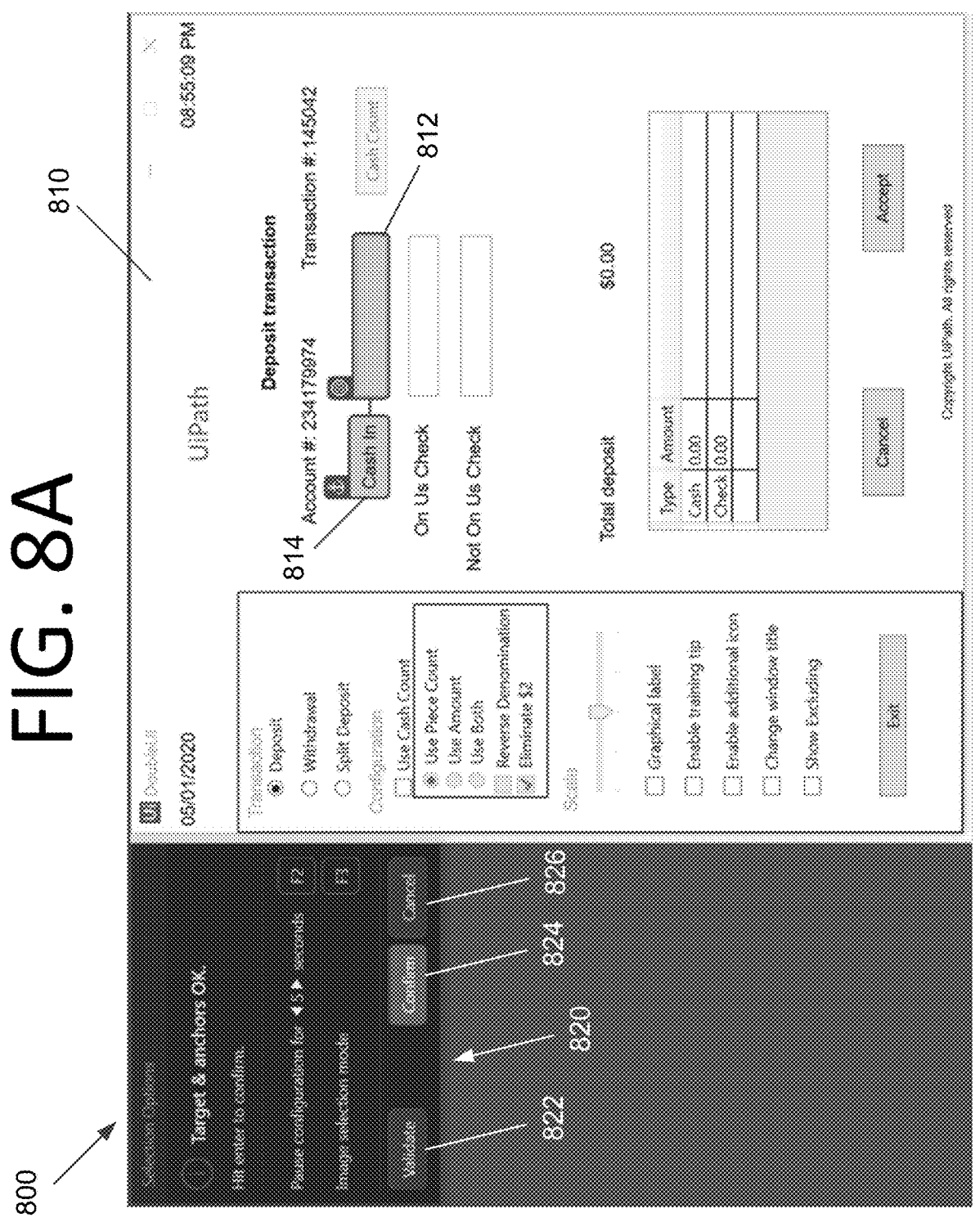
FIG. 8A is a screenshot illustrating target and anchor selection in an RPA designer application, according to an embodiment of the present invention.

FIG. 8A is a screenshot illustrating target and anchor selection in an RPA designer application 800, according to an embodiment of the present invention. RPA designer application includes an image 810 of a live application on which an automation is to be performed. The driver detects the selectable elements in the UI elements in image 810 (e.g., via an API call) and finds them in image 810 generally. A target and anchor selection pane 820 allows the user to designate and accept a target 812 with which an RPA workflow activity should interact and an anchor 814 to help identify target 812. In some embodiments, multiple anchors may be selected for the target. The user may validate that target 812 can be uniquely identified using validate button 822, confirm that the functionality is accurate using confirm button 824, or cancel the selection of a target and anchors using cancel button 826.

Figure 8B:
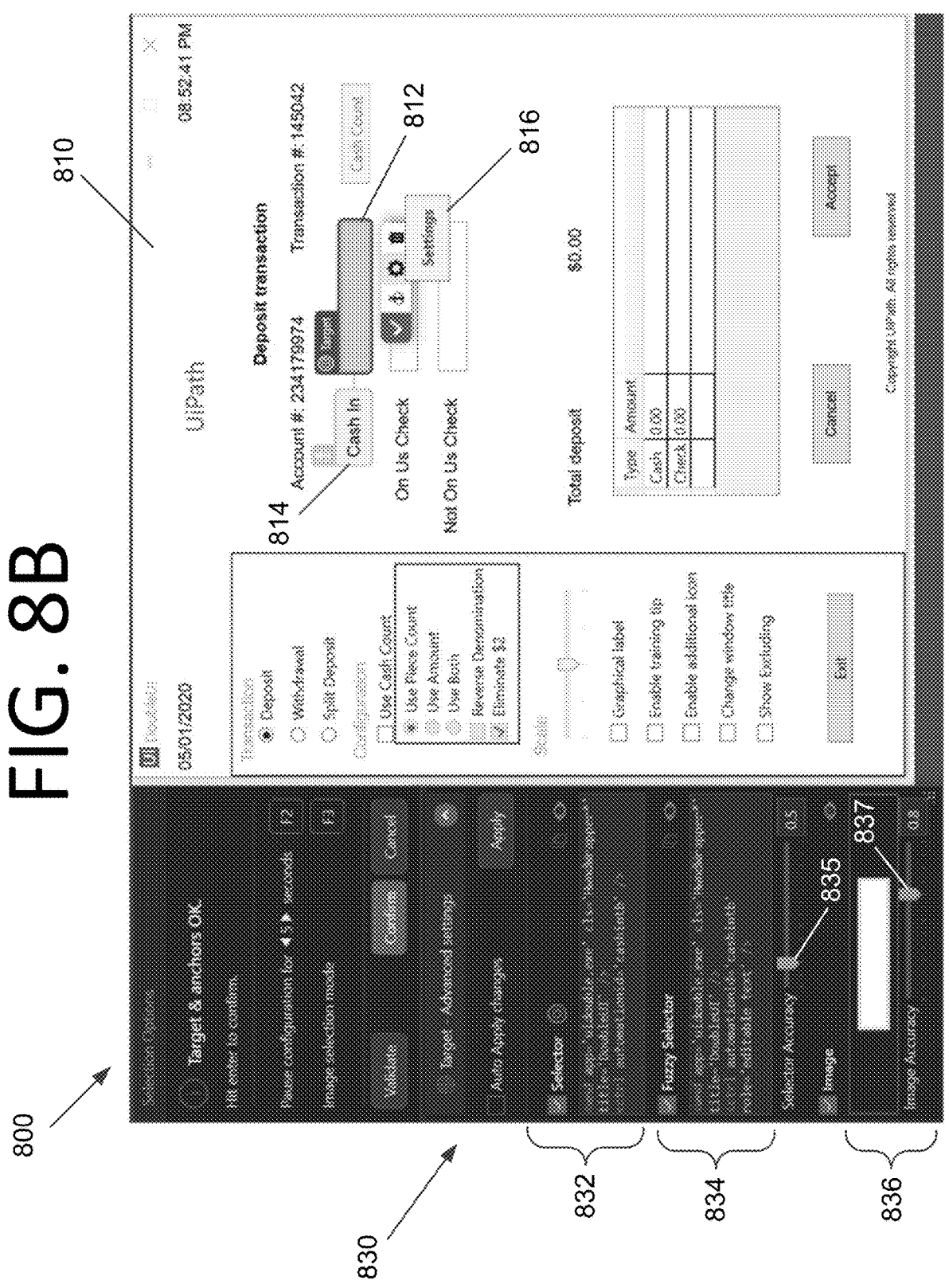
FIG. 8B is a screenshot illustrating target selection options in the RPA designer application, according to an embodiment of the present invention.

FIG. 8B is a screenshot illustrating target selection options in RPA designer application 800, according to an embodiment of the present invention. Here, the user has selected settings 816 in the options for target 812. The options may be displayed when the user moves the mouse over target 812, for example. The selection of settings 816 causes advanced settings pane 830 to be displayed below target and anchor selection pane 820.

A selector section 832 includes a tag that is searched to find the selector for target 812 in this embodiment. A fuzzy selector section 834 includes the tag with the added role "editable text". Slider 835 controls the accuracy of the selector. In certain embodiments, fuzzy anchor settings may also be shown. The developer may edit the tag directly in selector section 832 and fuzzy selector section 834 as well. An image matching section 836 causes RPA designer application 800 to employ an image matching method to search for target 812 and a respective slider 837 controls the image matching accuracy. The image of the UI element to be matched also appears above slider 837.

Clicking checkboxes associated with sections 832, 834, 836 causes RPA designer application 800 to apply the respective method when searching for target 812. Clicking the eye icon may call the search algorithm for respective section 832, 834, 836. Thus, the developer may test individual search methods for a given component to test and decide whether to include them. A "search method" is also referred to herein as a "search algorithm." Also, clicking validate button 822 validates all selected search strategies in this embodiment.

Figure 8C:
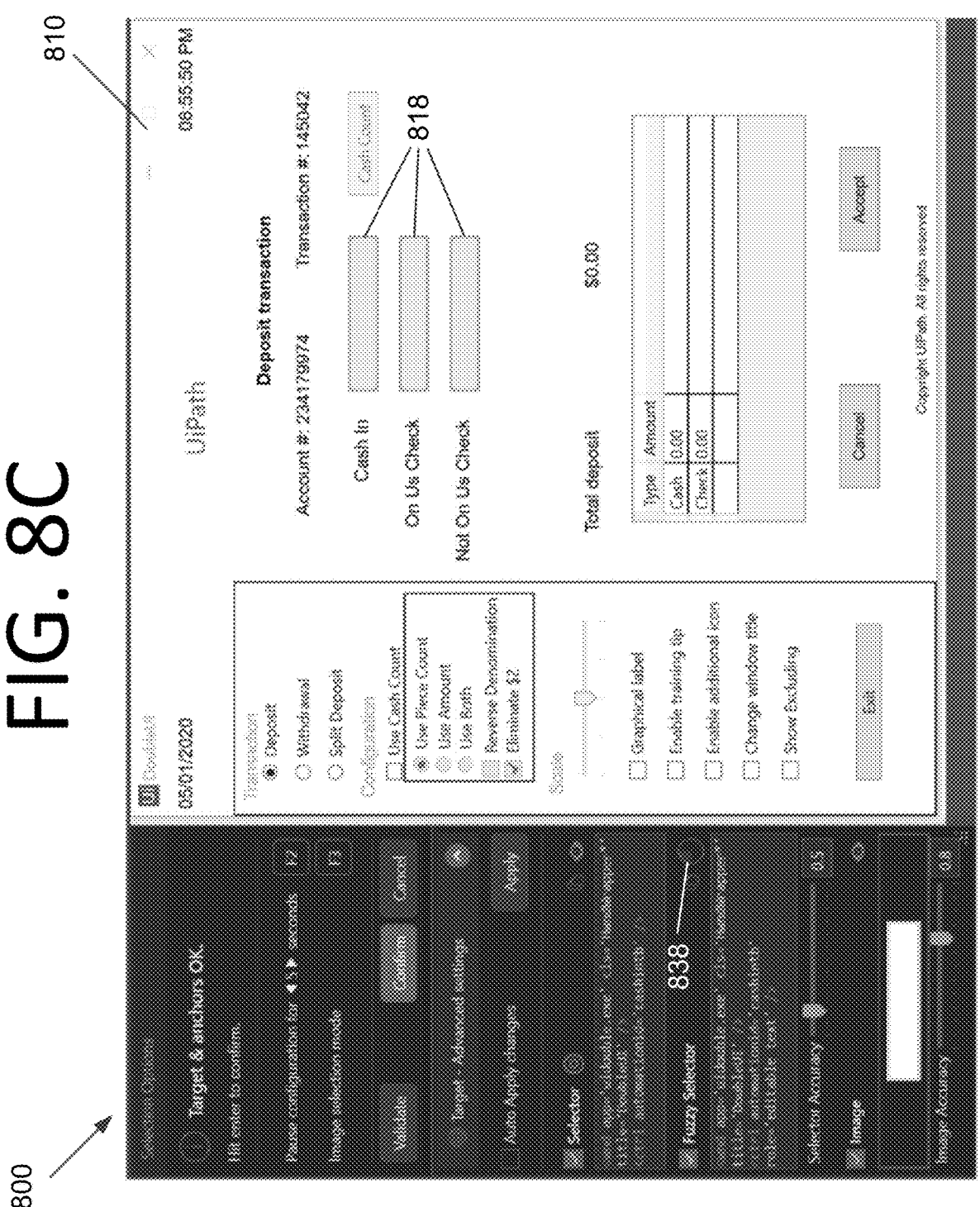
FIG. 8C is a screenshot illustrating fuzzy selector matches in the RPA designer application, according to an embodiment of the present invention.

FIG. 8C is a screenshot illustrating fuzzy selector matches in RPA designer application 800, according to an embodiment of the present invention. By clicking the respective eye icon of fuzzy selector section 834, a "match in progress" icon 838 appears in its place. RPA designer application 800 then employs the respective search method for fuzzy selector matching and shows matching elements 818 in image 810. Each of these elements has editable text, as defined in the tag. Thus, a given text field is not uniquely identified based on this tag alone without further refinement.

Some example matching techniques of some embodiments include, but are not limited to, exact matching and approximate matching. Exact matching typically requires that the runtime value of the respective attribute exactly match the design time value. Approximate matching may only require a partial match between the design time and runtime values of the respective attribute and is typically applied to attributes of text (e.g., character strings). Approximate matching techniques include, but are not limited to, regular expressions, wildcard, and fuzzy matching. Fuzzy matching is described in detail below according to some embodiments of the present invention.

Fuzzy matching denotes a matching criterion where the design time and runtime values of a target (and potentially anchor(s)) are allowed to differ by a respective threshold (e.g., a numerical threshold). Per the above, in some embodiments, different thresholds may be applied to the target and each anchor, if desired. In certain embodiments, the fuzzy matching threshold may be controlled by a slider, potentially for each respective attribute. Fuzzy matching may be applied to multiple attributes of a target and/or the anchor(s). The amount of similarity/mismatch between two attribute values is called a "similarity measure" herein, while the threshold is called a "similarity threshold" herein, without loss of generality. The threshold may be numerical, which may denote a real number taking a value within a predetermined range. Stated otherwise, the similarity threshold quantifies a variable amount or degree of acceptable mismatch. The same two values of a fuzzy attribute may be considered to match according to a one value of the similarity threshold and not to match according to another value of the similarity threshold in some embodiments.

In contrast to other approximate matching techniques (e.g., regular expression matching), where two character strings are allowed to differ only in certain positions/characters while other characters are matched exactly, fuzzy matching may allow any position/character to differ between the two strings in some embodiments. Another distinction is that while in other approximate matching techniques, such as regular expressions and wildcard, the amount of mismatch between the two strings is typically not limited, in fuzzy matching, the amount of mismatch may be capped at a predetermined amount. This may be controlled by a slider in some embodiments, per the above.

One of ordinary skill in the art will appreciate that the similarity measure may quantify an amount of similarity, as well as an amount of mismatch between two attribute values. Furthermore, in various embodiments, the similarity threshold may represent a maximum amount of mismatch or a minimum amount of similarity required for a match. The similarity measure may be expressed in various ways, such as according to an inter-string distance known as a "string metric." One example string metric known as the Levenshtein distance determines a count of operations necessary to transform one string into the other. Other inter-string distances include the Hamming distance and the Jaro-Winkler distance, among others.

Depending on the chosen manner of computing the similarity measure, the similarity threshold can have various interpretations. For instance, the similarity threshold may indicate a maximum count of characters that can differ between the two strings or a fractional degree of mismatch calculated as a proportion of the total count of characters (e.g., combined string length). In some embodiments, the similarity threshold may be re-scaled to a predetermined interval, such as between 0 and 1, between 0 and 100, between 7 and 34, etc. In one nonlimiting example, a relatively high similarity threshold (e.g., close to 1 or 100%) indicates a requirement for an almost exact match, i.e., the value of the fuzzy attribute in the runtime target is only allowed to depart very slightly from the value of the respective attribute in the design time target. In contrast, when the similarity threshold is relatively low (e.g., close to 0), almost any values of the respective fuzzy attribute are considered as matching.

Some allow adjusting the similarity threshold at design time, for instance by way of a slider. Some embodiments may enable the developer to manually code matching parameters, such as by coding a fuzzy similarity threshold for the respective tag for the target or anchor directly. Multiple attributes of the same tag may be simultaneously selected for fuzzy matching in some embodiments. Distinct attributes may be matched to distinct degrees (e.g., by setting distinct values for the fuzzy similarity threshold). These settings may then be incorporated into the respective activity of the RPA workflow.

In some embodiments, the respective element ID may be modified to include the fuzzy matching parameters for the target and/or anchor(s). A "fuzziness flag" may be used to earmark an attribute for fuzzy matching. In some embodiments, the fuzziness flag includes a set of new attribute-value pairs added to the existing tag to indicate the attribute(s) selected for fuzzy matching for the target and anchor(s) and to set the respective similarity threshold. For example, consider the following tag:

```
<wnd      app='java.exe'      cls='SunAwtFrame'
   title='SwingSet2'
```

```
matching:title='fuzzy' fuzzylevel:title='0.8'/>
``` where the attributes "matching:title" and "fuzzylevel:title" were added to the original <wnd/> tag. The matching:title attribute has the value "fuzzy" to indicate that the value of the "title" attribute of the current tag will be fuzzy matched at runtime. The value of the fuzzylevel:title attribute indicates the desired fuzzy similarity threshold specified by the developer (in this example, 0.8). One of ordinary skill in the art will appreciate that there may be many other ways of encoding a fuzziness flag earmarking a selected attribute for fuzzy matching without deviating from the scope of the invention. Selecting of target(s) and respective anchor(s) may be performed by the developer for each activity in accordance with the task(s) the developer seeks to accomplish. After completion of the design time phase, the logic may be transmitted in the form of an RPA script to a script repository and/or distributed to other RPA clients for execution.

As discussed above, in some embodiments, targets and anchor(s) for a UI element are found by performing geometric matching on a target and its anchor(s) identified using fuzzy matching. An RPA robot may send a request to a CV model or some other ML/AI model to perform the fuzzy matching, perform the geometric matching, or both, in some embodiments. However, in some embodiments, part or all of the fuzzy matching and/or geometric matching functionality is performed by the RPA robot. In certain embodiments, the RPA robot may send a captured image or screenshot for analysis by the model(s).

Consider an example where the target UI element that the RPA robot is seeking to interact with is a text field. The text field may include one or more text tokens that include one or more characters found between a set of delimiters, such as white space, punctuation characters, special characters, etc. Text tokens may additionally or alternatively include number(s), a date, an email address, a uniform resource identifier (URI), a zip code, etc.

A target text field may not be uniquely identifiable with a confidence threshold after performing fuzzy matching in some embodiments. One or more anchors associated with the target may be identified via fuzzy matching. Collectively, the fuzzy matched target and anchor(s) may have one or more relationships (e.g., geometric, positional, locational, coordinate-based, etc.). These relationships may be constrained within a tolerance in some embodiments. In certain embodiments, fuzzy matching is used for one or a subset of the target and anchor(s) rather than all UI elements. In some embodiments, characteristics of the fuzzy matching for the target and each of its anchor(s) may be customized. For instance, the target may have two fuzzy matched attributes, one anchor may not use fuzzy matching, and another anchor may have one fuzzy matched attribute. Any combination of fuzzy matched UI elements and/or fuzzy matched attributes may be used without deviating from the scope of the invention.

Figure 9:
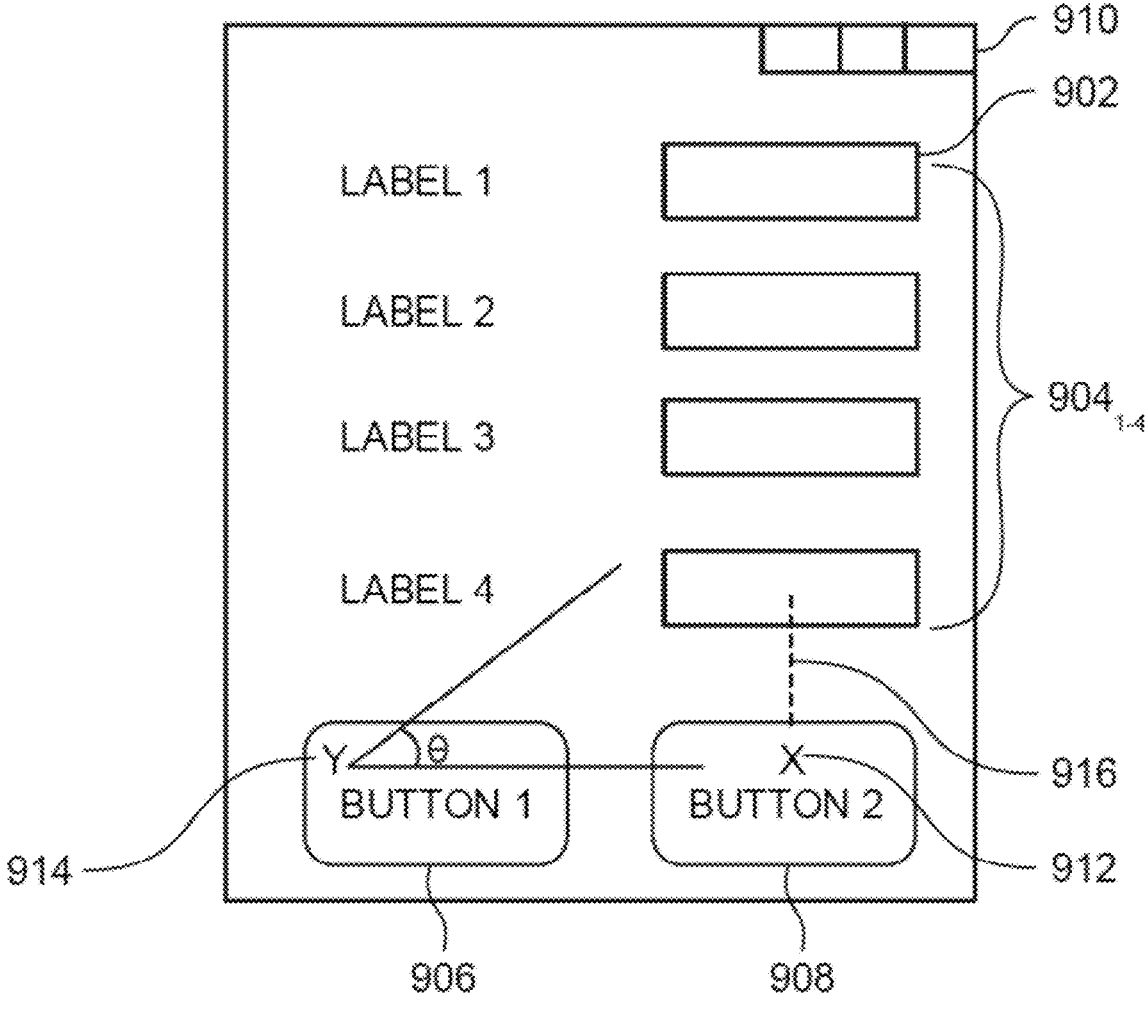
FIG. 9 illustrates a multi-anchoring example for RPA, according to an embodiment of the present invention.

FIG. 9 illustrates a multi-anchoring example 900 for RPA, according to an embodiment of the present invention. An anchor point X 912 has coordinates defined relative to the UI, relative to a location within or proximate to button 2 908, etc. Button 2 908 may have a bounding box (e.g., x, y, width, height) defining the dimensions of button 2 908 in the UI. Similarly, an anchor point Y 914 has coordinates defined relative to the UI, relative to a location within or proximate to button 1 906, etc. In some embodiments, relative relationships may be inferred between UI elements automatically by the RPA robot. Use of relative relationships during runtime may be performed using a CV module in some embodiments.

One or more relationships between a target and its anchor (s) may be elastic within a tolerance or threshold for changes or variance in scale, dots per inch (DPI), etc. in the UI or application area. Such "elasticity" may be particularly desirable for applications that have a dynamic or "fluid" layout, such as web pages that reflow the content based on window size. Elasticity may also be beneficial for a video stream or output of a virtual machine, remote machine, or virtual desktop environment. In certain embodiments, it may be desirable for at least some characteristics (e.g., geometric anchor or reference coordinates or angles) to be inelastic. For instance, no tolerance may be permitted for a distance of a segment drawn between the target and one anchor, but in an angle between that segment and another segment may be permitted.

Anchor point Y 914 may be utilized for element detection in a window or application 902 by measuring a geometric angular (θ) relationship between button 1 906 and a target text field 904₄. Multi-anchoring through anchor point X 912 and anchor point Y 914 may prevent robot crashes during runtime if elements in window or application 902 are substantially different or vary from that during automation development. This may be accomplished in some embodiments using a fuzzy target, multiple fuzzy anchors, and CV to uniquely identify the target UI element based on its relationship to the fuzzy anchor UI elements, its position in the interface, relevant text labels, etc.

Anchor point X 912 may be utilized to determine a distance relationship 916 between button 2 908 and target text field 904₄. Distance 916 between anchor point X and field 904₄ (e.g., in this example, from a center point thereof) may be relative or absolute. The relationships may be utilized by a CV module with OCR results. The results for all or a subset of detected UI elements may be provided with confidence levels for each UI element to reduce errors.

Figure 10:
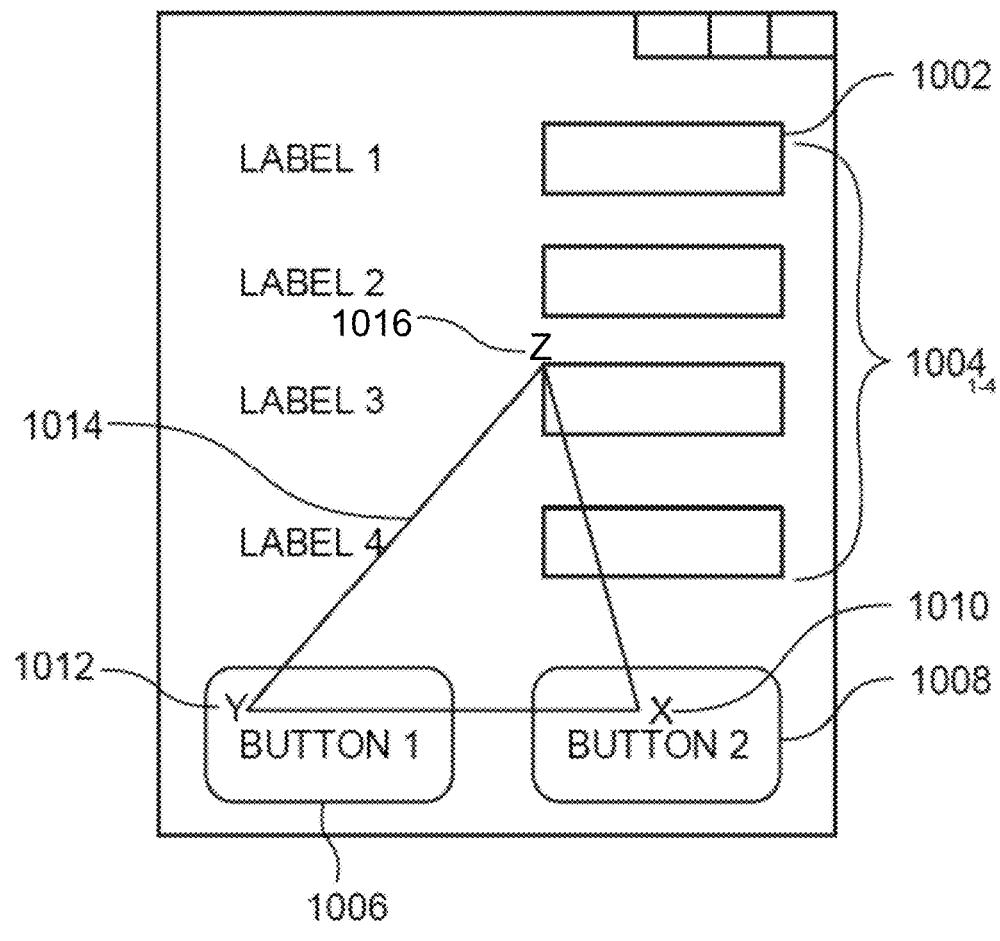
FIG. 10 illustrates another multi-anchoring example for RPA, according to an embodiment of the present invention.

FIG. 10 illustrates another multi-anchoring example 1000 for RPA, according to an embodiment of the present invention. A window or application 1002 in a UI includes labels 1-4 for text fields 1004₁₋₄, respectively, as well as button 1 1006 and button 2 1008. An anchor point X 1010 is defined within button 2, an anchor point Y 1012 is defined within button 1 1006, and a target point Z is defined within target text field 1004₃ (e.g., in this example, in the upper left corner thereof).

Anchor point Y 1012 and anchor point X 1010 may be utilized for UI element detection in window or application 1002 by analyzing a triangular relationship between anchor point X 1010, anchor point Y 1012, and target point Z 1016. Line segments may be determined between each point, such as segment 1014. Segment lengths, angles between segments, and tolerances may be used to find a given target. This relationship may be determined or utilized by a CV module in some embodiments.

It should be noted that other geometries, such as rectangles, N-sided polygons, segment sets from the target UI element to each anchor (e.g., segments form the center of a target UI element to each anchor UI element), etc. may be used without deviating from the scope of the invention. The potentially tolerance-constrained relationship between the target UI element and the anchor(s) may serve as a fingerprint, impression, template, or the like to find or identify the target UI element during runtime so an activity in the RPA robot workflow can interact with that UI element in the desired manner.

Fuzzy matching may be utilized to compensate for errors by OCR engines, such as Google™ cloud OCR, Microsoft™ OCR, Tesseract OCR™, or the like. An image or part of an image may be sent to an OCR module and/or a CV module to provide detected text and/or graphical elements. As an example, with fuzzy matching, labels 1-4 may each be assigned to a list of names. With fuzzy matching, detecting "NAM" or "NME" may be logically associated or matched with "NAME" and/or text fields may each be assigned to a list of text fields.

In the examples given herein, geometric matching with thresholding, such as for relative distance associated with an anchor, may be utilized for RPA of a UI. As an example, each element in an image of a UI may be related with a confidence, threshold, matching threshold, tolerance, or the like. Possible matches of an element below the threshold may be discarded. With multiple anchors, a possible relationship fit for UI elements may utilize a confidence interval (CI) such that false positives of one or more elements are reduced.

As an example, detected elements below a CI of 50%, 60%, 98%, or any desired value may be discarded. CI, confidence thresholds, tolerance thresholds, or the like may be based on ML models that may be trained or retrained. Different CI, confidence thresholds, tolerance thresholds, or the like levels or ranges may be utilized for matching elements in a UI during development or runtime of an RPA robot.

For a robot that may need to choose between two elements that both meet a matching threshold, a list of elements, types, or confidences may be utilized. In certain configurations with multiple matches, multiple anchors in a UI may serve to uniquely identify an element. In the examples given herein, geometries of multiple anchors may snap horizontally or vertically with a smaller tolerance for geometric thresholding. Anchors that snap horizontally or vertically with another element may be treated differently in certain embodiments. For instance, a smaller tolerance or no tolerance at all may be allowed for how far a direction can move perpendicular to a snapping axis. If a button is used as an anchor for a text field, label, button, etc., the runtime may be layered such that when a connection is made to the UI element, other lower probability elements may be connected at the respective location or coordinates.

Figure 11:
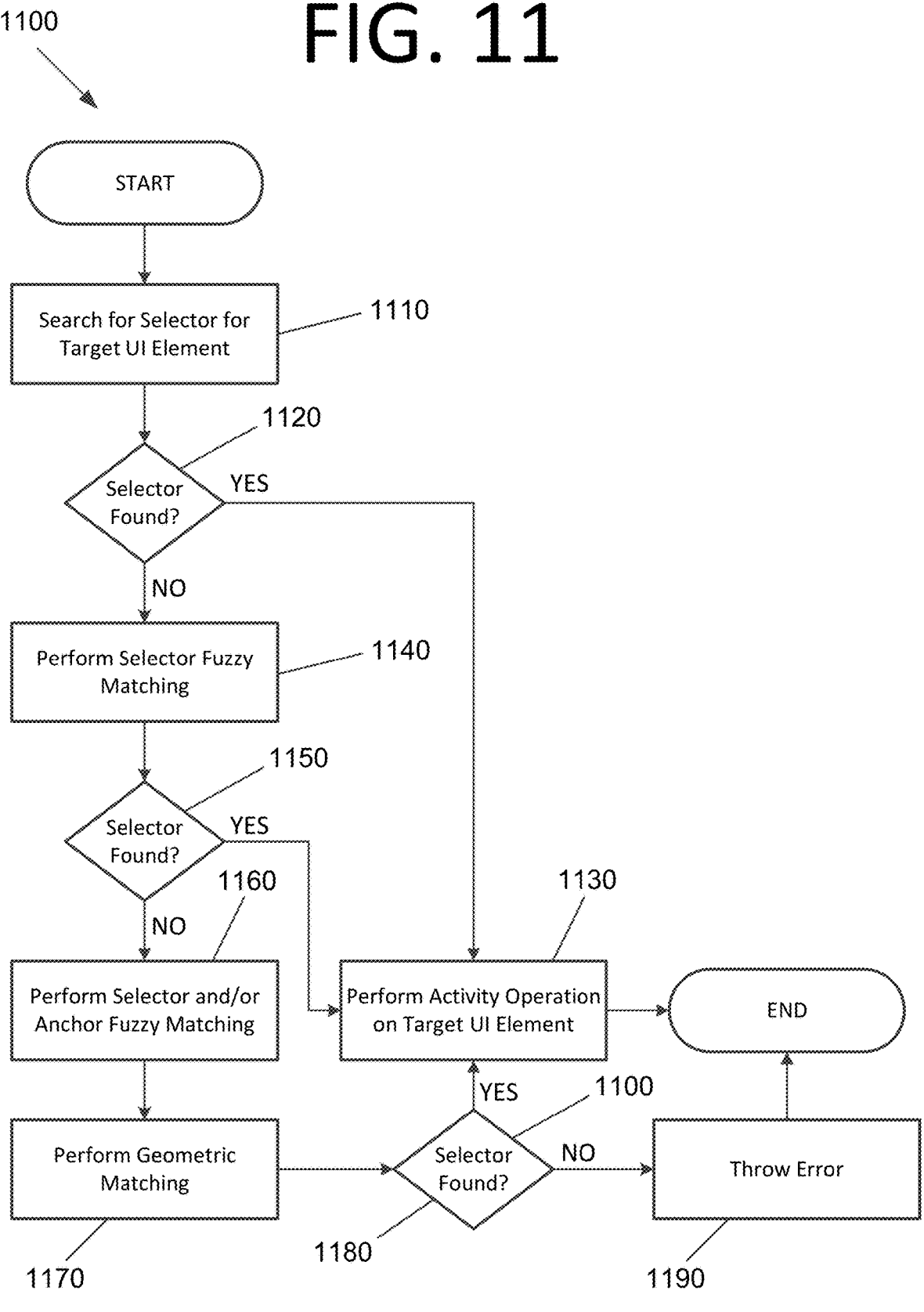
FIG. 11 is a flowchart illustrating a process for hierarchical target UI element identification and RPA robot activity execution, according to an embodiment of the present invention.

FIG. 11 is a flowchart illustrating a process 1100 for hierarchical target UI element identification and RPA robot activity execution, according to an embodiment of the present invention. The process begins with searching for a selector for a target UI element at 1110. This may be accomplished by screen scraping and/or using native OS functionality in some embodiments. If the selector for the UI element is found with at least a match strength threshold at 1120, the activity operation for the UI element is performed using the target selector at 1130. This may include clicking a button, entering information in a text field, selecting a menu operation, etc. In certain embodiments, operations interacting with multiple UI elements may be performed in a single activity and/or activities interacting with multiple UI elements may be executed in a sequence in an RPA workflow.

However, if the selector for the target UI element is not found, or has a confidence of less than the match strength threshold at 1120, fuzzy selector matching is attempted at 1140 for one or more attributes of the target UI element. For instance, a similarity measure for one or more attributes may be compared against one or more respective similarity thresholds. If the selector is found with at least the match strength threshold at 1150, the activity operation for the UI element is performed using the target selector at 1130.

However, if the selector for the target UI element is not found, or has a confidence of less than the match strength threshold at 1150, selector and/or anchor fuzzy matching is attempted at 1160 based on fuzzy matching setting for the selector and its anchor(s). For instance, one or more fuzzy attributes of the target UI element and the anchor(s) may be used for fuzzy matching, or a subset of elements may undergo fuzzy matching while another subset undergoes regular matching. Geometric matching is performed at 1170 based on the fuzzy matching results for the target and anchor(s).

If the selector for the target UI element is found at 1180, the activity operation for the UI element is performed using the target selector at 1130. However, if the selector for the target UI element is not found, the RPA robot throws an error at 1190. At this point, a user may seek to address the error or the error may be reported to an RPA developer to analyze the error and attempt to find a solution by modifying the target and anchor detection logic, for example.

Figure 12:
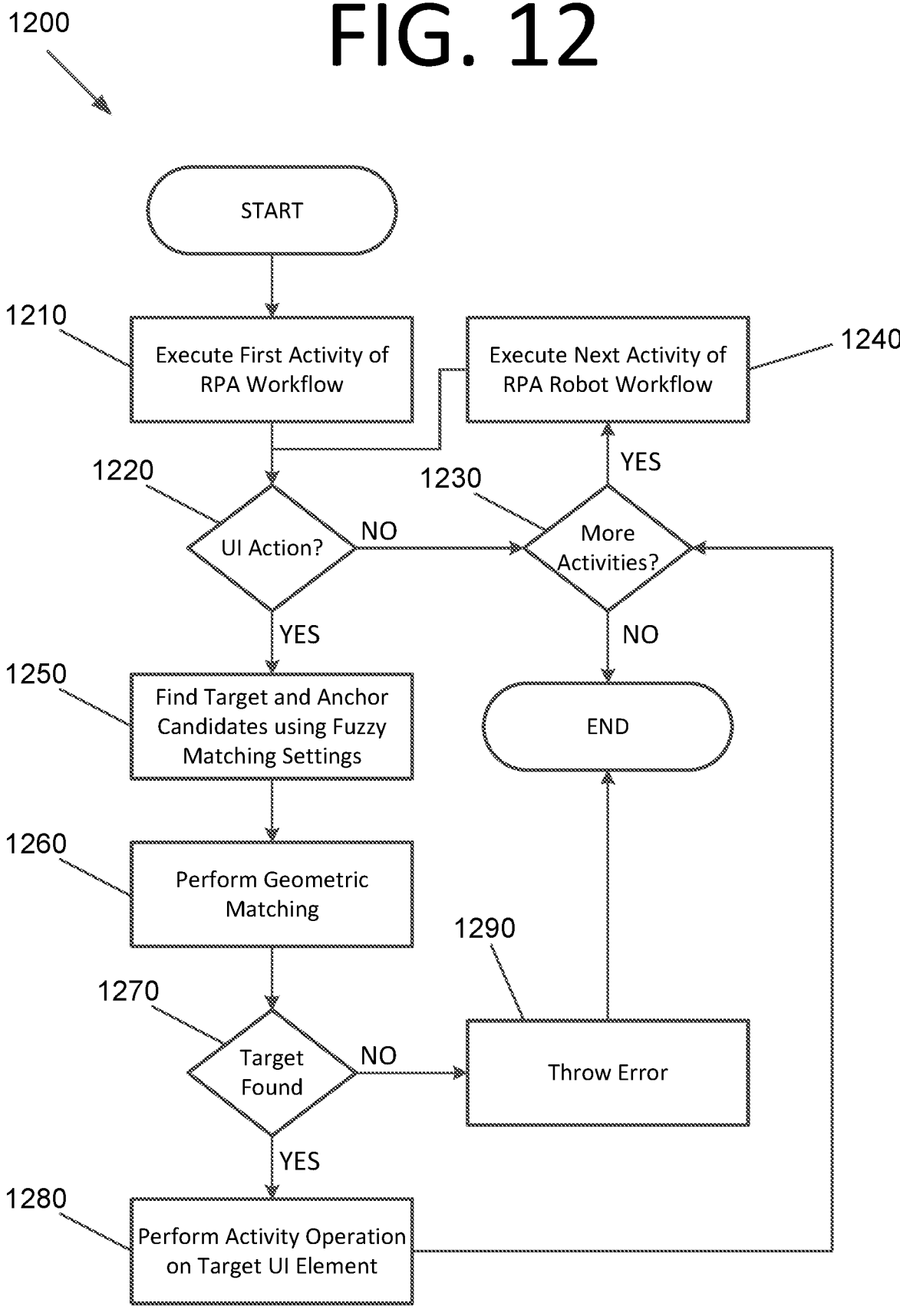
FIG. 12 is a flowchart illustrating a process for fuzzy logic selection for anchors and/or targets for RPA, according to an embodiment of the present invention.

FIG. 12 is a flowchart illustrating a process 1200 for fuzzy logic selection for anchors and/or targets for RPA, according to an embodiment of the present invention. The process begins with executing a first activity in an RPA workflow at 1210. If there is no UI action in the activity at 1220, and more activities are included in the RPA workflow at 1230, the robot proceeds to the next activity at 1240. If there are no more activities, execution of the workflow has completed, and the process ends.

If there is a UI action in the activity at 1220, such as clicking a button, entering text in a text field, selecting a menu item, opening or closing a window, submitting a form, etc., the RPA robot seeks to find target and anchor candidates for the target UI element for the UI action using matching settings at 1250. For instance, the RPA robot may determine the attributes of the target UI element and its anchor(s) and determine whether attributes employ fuzzy matching. The RPA robot may then search for the target and anchor(s) using these characteristics and fuzzy settings.

Geometric matching is performed on the target and anchor candidates at 1260 to determine whether a match exists with certain geometric constraints (e.g., tolerances for angles, segment lengths, etc.). If the target is found using fuzzy matching settings and geometric matching at 1270, the UI activity operation is performed on the target UI element at 1280, and the process proceeds to step 1230. If the target is not found at 1270, an error is thrown at 1290 and the process ends.

Figure 13:
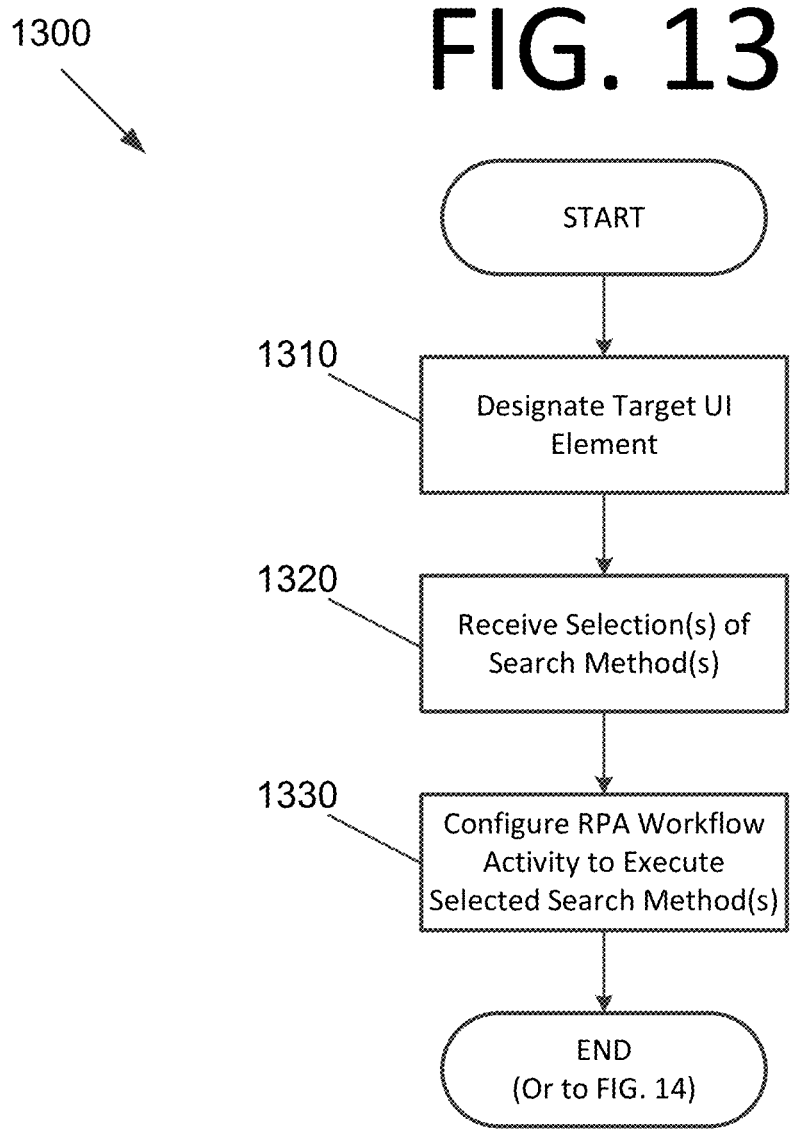
FIG. 13 is a flowchart illustrating a process for configuring one or more search methods for searching for a target UI element, according to an embodiment of the present invention.

FIG. 13 is a flowchart illustrating a process 1300 for configuring one or more search methods for searching for a target UI element, according to an embodiment of the present invention. The process begins with an RPA designer application designating a target UI element in an image of a portion or all of a UI of an application or a UI of a live application on which automation is to be performed at design time at 1310. This designation may be performed based on a user selection of a UI element in a live application UI or a screenshot of an application UI where UI elements have been recognized via the driver or CV, for instance.

Next, a selection of one or more search algorithms is received at design time by the RPA designer application at 1320. This may involve the user selecting and configuring the appropriate anchor(s), tag attributes, accuracy levels, choosing which search methods to employ, etc. The one or more search algorithms may include a selector search, a fuzzy selector search, a target and anchor search, a fuzzy target and anchor search, image matching, text matching (e.g., based on a string in a tag or OCR results), CV matching (e.g., searching for UI elements identified using CV), or a combination thereof. In some embodiments, the one or more search algorithms include parsing a UI tree for the UI of the application to identify one or more attributes of the target UI element, one or more anchors, one or more tags, or a combination thereof. In certain embodiments, all tags in the UI tree are found in one parse.

In some embodiments, when the one or more selected search methods include text matching, the text matching requires an exact match for text of candidates for the target UI element. In certain embodiments, when the one or more selected search methods include text matching, a match of an image associated with the target UI element is mandatory for the image matching to find a match. In some embodiments, when the one or more selected search methods include fuzzy selector matching, the fuzzy selector matching includes performing image matching.

The RPA designer application then configures the respective RPA workflow activity to execute the selected search algorithm(s) at design time at 1330. This may enable an RPA robot implementing a process that includes the activity to find the target element and perform the desired action(s) in the activity (e.g., clicking a button, entering text in a field, closing a window, etc.). In some embodiments, the configuring of the RPA workflow activity includes configuring one or more anchors, one or more tag attributes, one or more accuracy levels, or a combination thereof. In certain embodiments, the one or more selected search algorithms in the activity are configured to be executed in an order and execution is stopped when a currently executing search algorithm finds the target UI element.

Figure 14:
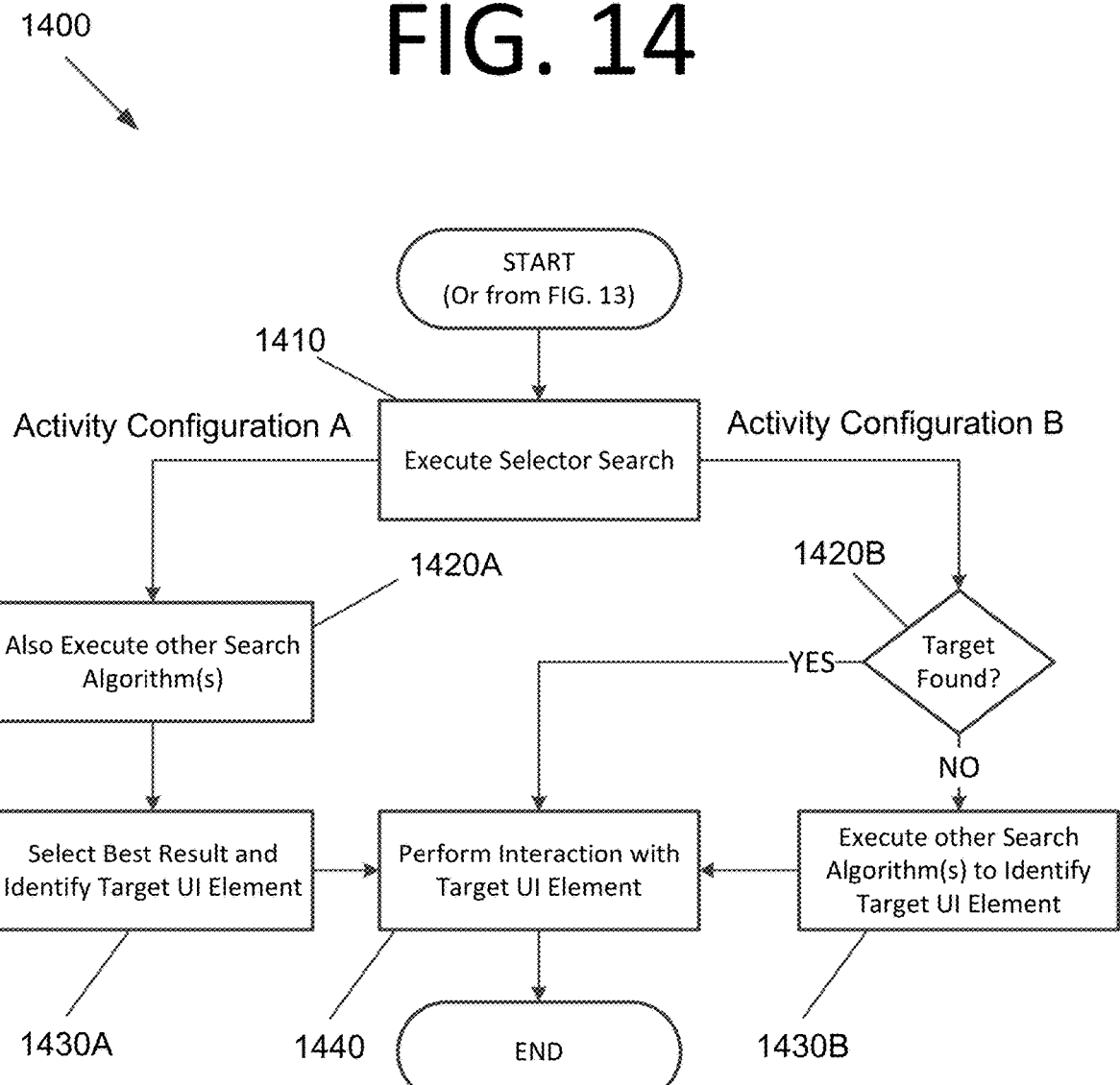
FIG. 14 is a flowchart illustrating a process for searching for a target UI element and implementing an activity of an RPA workflow, according to an embodiment of the present invention.

FIG. 14 is a flowchart illustrating a process 1400 for searching for a target UI element and implementing an activity of an RPA workflow, according to an embodiment of the present invention. In some embodiments, the processes of FIGS. 13 and 14 are one collective process, and FIG. 14 continues from FIG. 13. A selector search is executed for the target UI element at runtime at 1410 to identify the target UI element. This may be performed by an RPA robot implementing an activity calling the search algorithm(s) in an RPA workflow, for example.

In FIG. 14, there are two activity configurations, A and B, that may be specified at design time in some embodiments. If activity configuration A is selected, one or more other search algorithms in addition to the selector search (e.g., a fuzzy selector search, a target and anchor search, a fuzzy target and anchor search, image matching, text matching, CV matching, or a combination thereof) are also executed at 1420A. The best result is selected at 1430A to identify the target UI element, and an interaction with the identified target UI element is performed at 1440 based on the activity.

If activity configuration B is selected, if the target UI element is found at 1420B from the selector search, the interaction with the identified target UI element is performed at 1440 based on the activity. However, if the target UI element is not found, at least one of a fuzzy selector search, a target and anchor search, a fuzzy target and anchor search, image matching, text matching, and CV matching for the target UI element is performed to identify the target UI element at 1430B. The process then proceeds to step 1440 to perform the interaction with the target UI element.

In some embodiments, two or more of the fuzzy selector search, the target and anchor search, the fuzzy target and anchor search, the image matching, the text matching, and the CV matching are executed, and the execution of the two or more of the fuzzy selector search, the target and anchor search, the fuzzy target and anchor search, the image matching, the text matching, and the CV matching are performed based on an order in the activity. In certain embodiments, the fuzzy target and anchor search is performed by the RPA robot, and the fuzzy target and anchor search comprises determining the target and at least one anchor using fuzzy matching and performing geometric matching on the target and the at least one anchor determined using the fuzzy matching. In some embodiments, the fuzzy target and anchor search comprises calling a driver, a single driver call is made for the target and the at least one anchor, and the driver obtains all candidates for the target and the at least one anchor in a single traversal of a UI a tree for the application associated with the UI.

The process steps performed in FIGS. 7 and 11-14 may be performed by a computer program, encoding instructions for the processor(s) to perform at least part of the process(es) described in FIGS. 7 and 11-14 in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7 and 11-14, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for identifying a visible target user interface (UI) element associated with an activity of a robotic process automation (RPA) workflow, comprising:
    executing a selector search for the target UI element at runtime to identify the visible target UI element, by an RPA robot implementing the RPA workflow;
    responsive to the visible target UI element not being found, executing at least two of a fuzzy selector search, a target and anchor search, a fuzzy target and anchor search, image matching, text matching, computer vision (CV) matching, or a combination thereof, in parallel to identify the target UI element, by the RPA robot; and
    performing an interaction with the identified target UI element, by the RPA robot, based on the activity of the RPA workflow.

2. The computer-implemented method of claim 1, wherein
    the execution of the at least two of the fuzzy selector search, the target and anchor search, the fuzzy target and anchor search, the image matching, the text matching, and the CV matching are performed based on an order in the activity of the RPA workflow.

3. The computer-implemented method of claim 1, wherein
    the fuzzy target and anchor search is performed by the RPA robot, and
    the fuzzy target and anchor search comprises determining the target and at least one anchor using fuzzy matching and performing geometric matching on the target and the at least one anchor determined using the fuzzy matching.

4. The computer-implemented method of claim 3, wherein
    the fuzzy target and anchor search comprises calling a driver,
    a single driver call is made for the target and the at least one anchor, and the driver obtains all candidates for the target and the at least one anchor in a single traversal of a UI a tree for an application associated with the UI.

5. A computer-implemented method for identifying a target user interface (UI) element associated with an activity of a robotic process automation (RPA) workflow, comprising:

executing in parallel a selector search and at least two of a fuzzy selector search, a target and anchor search, a fuzzy target and anchor search, image matching, text matching, and computer vision (CV) matching for the target UI element at runtime, by an RPA robot configured to implement the RPA workflow;

selecting a best result from the selector search and the at least one of the fuzzy selector search, the target and anchor search, the fuzzy target and anchor search, the image matching, the text matching, and the CV matching based on validation scores, by the RPA robot, to identify the target UI element; and performing an interaction with the identified target UI element, by the RPA robot, based on the activity of the RPA workflow.

6. The computer-implemented method of claim 5, wherein the fuzzy target and anchor search is performed by the RPA robot, and the fuzzy target and anchor search comprises determining the target and at least one anchor using fuzzy matching and performing geometric matching on the target and the at least one anchor determined using the fuzzy matching.

7. The computer-implemented method of claim 1, wherein after performing the interaction with the identified target UI element based on the activity of the RPA workflow, the method further comprises:

proceeding to a next activity in the RPA workflow that requires identification of another target UI element; and repeating the method of claim 1 for the other target UI element.

8. The computer-implemented method of claim 1, wherein a UI action of the activity comprises clicking a button, entering text in a text field, selecting a menu item, opening a window, closing the window, or submitting a form.

9. The computer-implemented method of claim 8, wherein the fuzzy target and anchor search comprises calling a driver, a single driver call is made for the target and the at least one anchor, and the driver obtains all candidates for the target and the at least one anchor in a single traversal of a UI a tree for an application associated with the UI.

10. The computer-implemented method of claim 5, wherein after performing the interaction with the identified target UI element based on the activity of the RPA workflow, the method further comprises:

proceeding to a next activity in the RPA workflow that requires identification of another target UI element; and repeating the method of claim 5 for the other target UI element.

11. The computer-implemented method of claim 5, wherein a UI action of the activity comprises clicking a button, entering text in a text field, selecting a menu item, opening a window, closing the window, or submitting a form.

12. A non-transitory computer-readable medium storing a computer program for identifying a target user interface (UI) element associated with an activity of a robotic process automation (RPA) workflow, the computer program configured to cause at least one processor to:

execute a selector search for the target UI element at runtime to identify the target UI element, and responsive to the target UI element not being found, execute at least one other search algorithm to identify the target UI element and perform an interaction with the identified target UI element based on the activity of the RPA workflow; or execute the selector search and the at least one other search algorithm, select a best result from the selector search and the at least one other search algorithm based on validation scores to identify the target UI element, and perform the interaction with the identified target UI element based on the activity of the RPA workflow, wherein the at least one other search algorithm comprises a fuzzy selector search, a target and anchor search, a fuzzy target and anchor search, image matching, text matching, computer vision (CV) matching, or a combination thereof, wherein the at least one other search algorithm comprises at least two search algorithms, and the at least two search algorithms are performed in parallel.

13. The non-transitory computer-readable medium of claim 12, wherein two or more of the fuzzy selector search, the target and anchor search, the fuzzy target and anchor search, the image matching, the text matching, and the CV matching are performed based on an order in the activity of the RPA workflow.

14. The non-transitory computer-readable medium of claim 12, wherein the fuzzy target and anchor search comprises determining the target and at least one anchor using fuzzy matching and performing geometric matching on the target and the at least one anchor determined using the fuzzy matching.

15. The non-transitory computer-readable medium of claim 14, wherein the fuzzy target and anchor search comprises calling a driver, a single driver call is made for the target and the at least one anchor, and the driver obtains all candidates for the target and the at least one anchor in a single traversal of a UI a tree for an application associated with the UI.

16. The non-transitory computer-readable medium of claim 12, wherein after performing the interaction with the identified target UI element based on the activity of the RPA workflow, the method further comprises:

proceeding to a next activity in the RPA workflow that requires identification of another target UI element; and repeating the steps of claim 12 for the other target UI element.

17. The non-transitory computer-readable medium of claim 16, wherein responsive to all activities in the RPA workflow having been completed, the computer program ends.

18. The non-transitory computer-readable medium of claim 12, wherein a UI action of the activity comprises clicking a button, entering text in a text field, selecting a menu item, opening a window, closing the window, or submitting a form.

19. The non-transitory computer-readable medium of claim 12, wherein the computer program is an RPA robot.

\* \* \* \* \*